US012026391B2

(12) United States Patent
Hironaka et al.

(10) Patent No.: US 12,026,391 B2
(45) Date of Patent: Jul. 2, 2024

(54) COPY CONTROL DEVICE AND COPY CONTROL METHOD

(71) Applicant: Hitachi, Ltd., Tokyo (JP)

(72) Inventors: Kazuei Hironaka, Tokyo (JP); Kenta Sato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/940,311

(22) Filed: Sep. 8, 2022

(65) Prior Publication Data
US 2023/0273740 A1 Aug. 31, 2023

(30) Foreign Application Priority Data
Feb. 28, 2022 (JP) .................... 2022-030125

(51) Int. Cl.
*G06F 3/06* (2006.01)

(52) U.S. Cl.
CPC ............ *G06F 3/065* (2013.01); *G06F 3/0623* (2013.01); *G06F 3/067* (2013.01)

(58) Field of Classification Search
CPC ......... G06F 3/065; G06F 3/0623; G06F 3/067
See application file for complete search history.

(56) References Cited

U.S. PATENT DOCUMENTS

| 8,250,031 | B2 | 8/2012 | Kawaguchi |
| 10,656,864 | B2 | 5/2020 | Bernat et al. |
| 2010/0333116 | A1* | 12/2010 | Prahlad ................. G06F 3/0649 713/153 |
| 2019/0129806 | A1* | 5/2019 | Hsu ...................... G06F 3/0641 |

* cited by examiner

*Primary Examiner* — Baboucarr Faal
(74) *Attorney, Agent, or Firm* — Foley & Lardner LLP

(57) ABSTRACT

A copy control device for controlling a data copy between a plurality of cloud systems each including one or a plurality of storage devices collects predetermined information for determining data duplication between storage devices, accepts a copy process request for a data copy from a storage device in a copy source cloud system to a copy destination storage device in a different cloud system, determines duplication between copy target data designated in the copy process request and data in the different cloud system on the basis of the collected predetermined information, instructs the different cloud system to copy duplicate data from the storage device having the duplicate data to the copy destination storage device, and instructs the copy source cloud system to copy remaining data of the copy target data to the copy destination storage device.

6 Claims, 24 Drawing Sheets

FIG. 5

ORGANIZATION INFORMATION DB 31

| ORGANIZATION ID | ORGANIZATION CODE | ORGANIZATION TYPE | ORGANIZATION NAME | CONTRACTUAL SITUATION |
|---|---|---|---|---|
| 001 | Org A | Customer | N.Bank | Active |
| 002 | Org B | Customer | B.Enterprise | Active |
| 003 | Org C | Partner | M.Plumber | Inactive |
| ... | ... | ... | ... | ... |

STORAGE MANAGEMENT INFORMATION DB 16

| ORGANIZATION ID | PRODUCT NUMBER | STORAGE TYPE | MODEL NAME | FW Version | STORAGE NAME | LOCATION INFORMATION | STORAGE STATE |
|---|---|---|---|---|---|---|---|
| 001 | 20080 | SDS Block | aaaa | v1.2 | Storage A | Cloud A | Online |
| 002 | 40009 | SDS File | bbbb | V4.5 | Storage B | Cloud A | Online |
| 003 | 56590 | Block | cccc | V9.8 | Storage C | Cloud B | Offline |
| 004 | 54280 | Block | dddd | V8.2 | Storage D | Cloud E | Online |
| ... | ... | ... | ... | ... | ... | ... | ... |
| 16A | 16B | 16C | 16D | 16E | 16F | 16G | 16H |

FIG. 7A

INTEGRATED HASH MANAGEMENT INFORMATION DB 18

| PRODUCT NUMBER | HASH VALUE |
|---|---|
| 20080 | 7726f55012e1e26cc762c9982e7c6c54ca7bb303 |
| | 7f72f06dc7d2f7efee260f0d2ab9d4d2d61d9330 |
| | a09e0a5e563c709c717ea61b6f3a153e6be2a2aa |
| | ... |
| 40009 | ... |
| ... | ... |

18AX  18BX

INTEGRATED HASH MANAGEMENT INFORMATION DB 18

| PRODUCT NUMBER | BUCKET VALUE |
|---|---|
| 20080 | {12,62086,92019,···,672819,27118,272828} |
| 40009 | {10230980,29831,98,···,567,29877,776280} |
| 56590 | {78979,556731,9876,···,54312,1290,87542} |
| 54280 | {8754, 86, 19,···,679,2712318,272828} |
| ... | ... |

VOLUME MANAGEMENT INFORMATION TABLE 33

| VOLUME NUMBER | VOLUME CAPACITY | DATA REDUCTION ACTIVATION | POOL NUMBER |
|---|---|---|---|
| 1 | 1TB | INACTIVATED | 1 |
| 2 | 2TB | ACTIVATED | 1 |
| 3 | 320GB | INACTIVATED | 1 |
| 4 | 320GB | INACTIVATED | 1 |
| 5 | 32TB | INACTIVATED | N/A |
| ... | ... | ... | ... |
| 33A | 33B | 33C | 33D |

POOL MANAGEMENT INFORMATION TABLE 34

| POOL NUMBER | POOL CAPACITY | POOL ALLOCATION CAPACITY | POOL USE CAPACITY | POOL VOLUME INFORMATION |
|---|---|---|---|---|
| 1 | 10TB | 4TB | 1TB | {1} |
| 2 | 20TB | 4TB | 2.2TB | {2, 3} |
| 3 | 30TB | 10TB | 8TB | {4, 5, 6} |
| ... | ... | ... | ... | ... |

LOGICAL ADDRESS MANAGEMENT INFORMATION TABLE 35

| VOLUME NUMBER | LOGICAL ADDRESS | REFERENCE VOLUME NUMBER | REFERENCE LOGICAL ADDRESS | SIZE | HASH VALUE | REFERENCE NUMBER |
|---|---|---|---|---|---|---|
| 1 | 0x00000000 | 1 | 0x00000000 | 8192 | 7726f55012e1e26⋯ | 1 |
| | 0x00002000 | 1 | 0x00002000 | 8192 | 7f72f06dc7d2f7ef⋯ | 1 |
| | 0x00004000 | 1 | 0x00004000 | 8192 | A09e0a5e563c709⋯ | 2 |
| | 0x00006000 | 3 | 0x00022000 | 8192 | B27f3118b8edd88c⋯ | 0 |
| | ... | ... | ... | ... | ... | ... |
| 2 | ... | ... | ... | ... | ... | ... |
| ... | ... | ... | ... | ... | ... | ... |

HASH MANAGEMENT INFORMATION TABLE 11

| HASH VALUE | VOLUME NUMBER | LOGICAL ADDRESS | SIZE |
|---|---|---|---|
| 7726f55012e1e26··· | 1 | 0x00000000 | 8192 |
| 7f72f06dc7d2f7ef··· | 1 | 0x00002000 | 8192 |
| A09e0a5e563c709c··· | 1 | 0x00004000 | 8192 |
| B27f3118b8edd88c··· | 2 | 0x00006000 | 8192 |
| ... | ... | ... | ... |
| 11A | 11B | 11C | 11D |

FIG. 14

FILE/OBJECT MANAGEMENT INFORMATION TABLE 36

| FILE/OBJECT ID | FILE/OBJECT TYPE | FILE/OBJECT NAME | FILE SIZE | HASH VALUE |
|---|---|---|---|---|
| 1 | File | aaa | 1024KB | 7726f55012e1e26··· |
| 2 | File | bbb | 8192KB | 7f72f06dc7d2f7ef··· |
| 3 | Object | ccc | 512MB | A09e0a5e563c709c··· |
| 4 | Object | ddd | 512MB | B27f3118b8edd88c··· |
| ... | ... | ... | ... | ... |
| 36A | 36B | 36C | 36D | 36E |

FILE HASH MANAGEMENT INFORMATION TABLE 22

FIG. 16

COPY PROCESS REQUEST 40

| | | |
|---|---|---|
| PROCESS MANAGEMENT NUMBER | 1234 | 41A |
| COPY MODE | VOLUME COPY | 41B |
| COPY SOURCE STORAGE PRODUCT NUMBER | 20080 | 41C |
| COPY SOURCE VOLUME NUMBER | 2 | 41D |
| COPY DESTINATION STORAGE PRODUCT NUMBER | 2190 | 41E |
| COPY DESTINATION VOLUME NUMBER | 2 | 41F |

(41 brackets all above)

COPY SOURCE VOLUME HASH VALUE LIST (42):

| LOGICAL ADDRESS | SIZE | HASH VALUE | COPY-COMPLETION FLAG |
|---|---|---|---|
| 00000000 | 8192 | 7726f5… | UNCOMPLETED |
| 00000001 | 8192 | 7f72f0… | UNCOMPLETED |
| 00000002 | 8192 | A09e0a… | UNCOMPLETED |
| … | … | … | … |

(42XA, 42XB, 42XC, 42XD) — 42X

COPY TARGET FILE LIST (43):

| FILE NAME | SIZE | HASH VALUE | COPY-COMPLETION FLAG |
|---|---|---|---|
| aaaa | 512MB | 7726f55… | UNCOMPLETED |
| bbbb | 64MB | 5e563c… | UNCOMPLETED |
| … | … | … | … |

(43XA, 43XB, 43XC, 43XD) — 43X

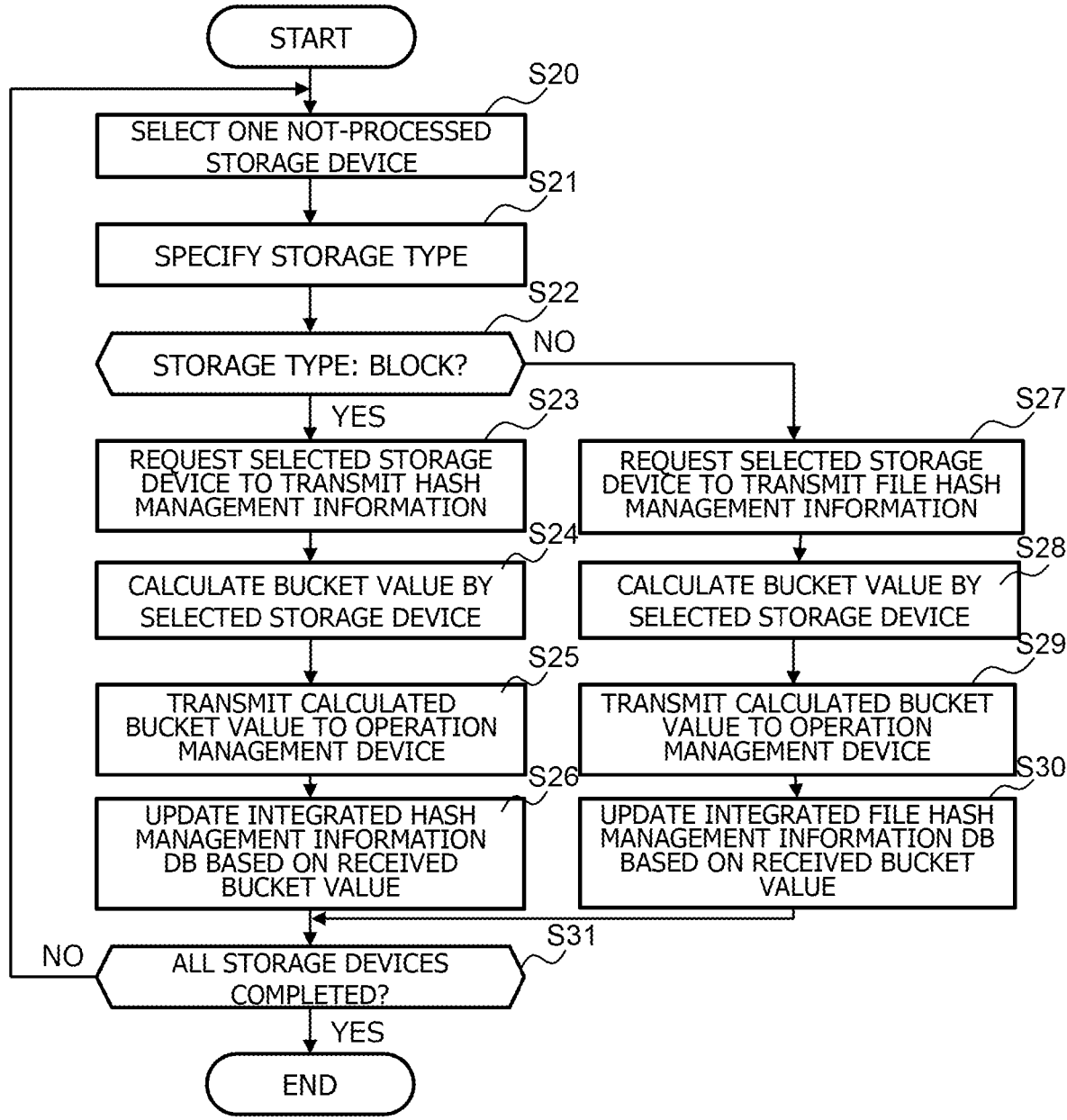

COPY CONTROL DEVICE AND COPY CONTROL METHOD

BACKGROUND OF THE INVENTION

1. Field of the Invention

The present invention relates to a copy control device and a copy control method, and is suitable for application to an operation management device which manages operations of respective storage devices provided in a plurality of cloud systems each including one or a plurality of storage devices, for example.

2. Description of the Related Art

Cloud use by information technology (IT) systems has been widespread in recent years. Many companies therefore attempt to construct and operate IT systems using services provided by a plurality of cloud providers different for each. This tendency is produced by demands of users each intending to select a cloud provider providing optimal services for each of IT systems in a current situation where unique services are provided by each of cloud providers, for example.

In a certain case, for example, an already-existing business system may be constructed using a cloud system A provided by a cloud provider A, while a new IT system using machine learning or the like may be constructed using a cloud system B provided by a cloud provider B which offers detailed support associated with machine learning.

It is considered that this situation assumed herein inevitably produces such a motive for offering data of the existing business system constructed in the existing cloud system A also for use by a new business system constructed in the cloud system B.

It is known herein that a pay-per-use system which charges according to use situations is generally adopted for a usage charge of a cloud system. For example, for an ordinary type of cloud computing, a usage charge is added according to performance or use time of used calculation resources. This is also applicable to a case of use of network connection in a cloud system. Generally, a charge is added according to a communication data amount transmitted to a cloud system.

In this case, many cloud providers adopt different charge systems for a communication type associated with communication from the outside of a cloud system to the inside of the cloud system (generally referred to as inbound), and for a charge system for a communication type associated with communication from the inside of a cloud system to the outside of the cloud system (generally referred to as outbound) to achieve pay-per-use for use of network connection. Specifically, the inbound communication is not often covered by pay-per-use (free of charge), while the outbound communication is often covered by pay-per-charge.

Accordingly, assuming such a case where data movement is achieved between cloud systems provided by different cloud providers as described above, communication for transferring data from a source cloud system of movement corresponds to the outbound communication described above. In this case, costs are produced according to the amount of the data to be moved.

As described above, concerning use of cloud systems, costs produced by data movement are directly added to operation costs. Accordingly, reduction of these costs is considered to be demanded in such a situation where a large amount of data move between a plurality of different cloud systems, for example.

Moreover, various types of storage devices for storing data are available for a cloud system. For example, available is such a service providing a virtual storage appliance which offers a virtual storage device in a cloud by using software performing a function of a storage device called as a software defined storage (SDS).

These storage devices are each capable of providing a storage function or a monitoring/management function compatible with conventional and physical storage devices for users. For example, storage functions such as backup, data copy, and replication compatible with each other are available between conventional storage devices in an on-premises environment and virtual storage devices constructed in a cloud.

Furthermore, the number of companies each adopting such an operation using both an own on-premises environment and a cloud system is increasing. Accordingly, for allowing integrated management for integrating operation management of existing storage devices and IT assets set in an on-premises environment, and operation management of virtual storages and IT assets constructed in a cloud, a software-as-a-service (SaaS) type IT operation management device has appeared as a device providing an IT operation management device itself as a cloud.

According to SaaS mentioned herein, a user is capable of achieving comprehensive and integrated operation management of IT assets running in an on-premises data center or a plurality of clouds by monitoring the IT assets of the user from the cloud regardless of a physical location where the IT assets are disposed.

In addition, concerning functions such as replication and remote copy aiming at backup or disaster recovery achieved between a plurality of storage devices, each of technologies disclosed in the specification of U.S. Pat. No. 8,250,031 B2 and the specification of U.S. Pat. No. 10,656,864 B2 identified below is known, for example, as a conventional technology for reducing a data transfer amount associated with data replication.

Specifically, U.S. Pat. No. 8,250,031 B2 discloses a technology which reduces a data transfer amount produced in a network connecting storage devices by detecting only difference data in data update generated by a copy source device, and transmitting only the difference data to a copy destination device in a case where remote copy for synchronizing data between a plurality of storage devices is carried out.

Moreover, U.S. Pat. No. 10,656,864 B2 discloses a technology which shortens a processing time and reducing a data transfer amount by comparing a volume or snapshot data of a replication source with data already stored in a replication destination storage, and designating only unique data not stored in the replication destination storage as a target of a replication process at the time of replication of the volume or the snapshot data from the replication source device to the replication destination device for replication between a plurality of storage devices.

SUMMARY OF THE INVENTION

In a case of use of unique services provided in cloud systems as described above, for example, data movement is needed between storage devices operated in different cloud systems or the like.

For example, for moving data from a first volume of a first storage device included in a first cloud system to a second volume of a second storage device included in a second cloud system, this data movement process is achieved by outbound communication of the first cloud system. Accordingly, this process is generally covered by pay-per-use according to a data movement amount.

In this case, non-ignorable costs are produced by data movement between different cloud systems according to data movement, and may become a factor increasing IT system operation costs imposed on users, or causing lock-in of users in cloud systems provided by particular cloud providers.

The present invention has been developed in consideration of the points described above, and proposes a copy control device and a copy control method capable of reducing a data movement amount between cloud systems produced at the time of data copy achieved between the cloud systems, and thereby reducing costs required for data copy between the cloud systems.

For achieving the above object, an aspect of the present invention is directed to a copy control device for controlling data copy between a plurality of cloud systems each including one or a plurality of storage devices. The copy control device includes: an information collection unit that collects, from the storage devices of the respective cloud systems, predetermined information for determining presence or absence of duplication between data stored in one of the storage devices, and different data stored in a different one of the storage devices; a copy process acceptance unit that accepts a copy process request for copying data from the storage device included in the cloud system corresponding to a copy source to the storage device included in a different cloud system of the cloud systems; a data duplication comparison unit that determines duplication between copy target data designated in the accepted copy process request, and respective data in the cloud system to which the storage device included in the different cloud system corresponding to a copy destination belongs on the basis of the predetermined information collected by the information collection unit; and a copy instruction unit that determines a copy system of the data on the basis of a determination result obtained by the data duplication comparison unit, and instructs the storage device to copy the copy target data to the storage device corresponding to the copy destination in accordance with the determined copy system. The copy instruction unit instructs the different cloud system to copy the data included in the copy target data and determined by the data duplication comparison unit as data duplicated with the data included in the different cloud system corresponding to the copy destination, from the storage device having the corresponding data to the storage device corresponding to the copy destination, and instructs the cloud system corresponding to the copy source to copy remaining data of the copy target data to the storage device corresponding to the copy destination.

In addition, another aspect of the present invention is directed to a copy control method executed by a copy control device for controlling data copy between a plurality of cloud systems each including one or a plurality of storage devices. The copy control method includes: a first step of collecting, from the storage devices of the respective cloud systems, predetermined information for determining presence or absence of duplication between data stored in one of the storage devices, and different data stored in a different one of the storage devices; a second step of accepting a copy process request for copying data from the storage device included in the cloud system corresponding to a copy source to the storage device included in a different cloud system of the cloud systems; a third step of determining duplication between copy target data designated in the accepted copy process request, and respective data in the cloud system to which the storage device included in the different cloud system corresponding to a copy destination belongs on the basis of the collected predetermined information; and a fourth step of determining a copy system of the data on the basis of a determination result, and instructing the storage device to copy the copy target data to the storage device corresponding to the copy destination in accordance with the determined copy system. The copy control device, in the fourth step, instructs the different cloud system to copy the data included in the copy target data and determined by the data duplication comparison unit as data duplicated with the data included in the different cloud system corresponding to the copy destination, from the storage device having the corresponding data to the storage device corresponding to the copy destination, and instructs the cloud system corresponding to the copy source to copy remaining data of the copy target data to the storage device corresponding to the copy destination.

The copy control device and the copy control method according to the present invention can reduce an amount of data movement between cloud systems, the data movement being required at the time of a data copy between cloud systems.

The present invention can offer a copy control device and a copy control method capable of reducing costs required for data movement between cloud systems.

BRIEF DESCRIPTION OF THE DRAWINGS

FIG. 5 is a chart presenting a configuration example of an organization information database;

FIG. 6 is a chart presenting a configuration example of a storage management information database;

FIG. 7A is a chart presenting a configuration example of an integrated hash management information database in a case where hash management information is constituted by hash values;

FIG. 7B is a chart presenting a configuration example of the integrated hash management information database in a case where the hash management information is constituted by bucket values;

FIG. 10 is a chart presenting a configuration example of a volume management information table;

FIG. 12 is a chart presenting a configuration example of a logical address management information table;

FIG. 13 is a chart presenting a configuration example of a hash management information table;

FIG. 14 is a chart presenting a configuration example of a file/object management information table;

FIG. 16 is a chart presenting a data structure example of a copy process request;

FIG. 17 is a flowchart presenting a processing procedure of an integrated hash management information or others collection process;

DESCRIPTION OF THE PREFERRED EMBODIMENT

Figure 1:
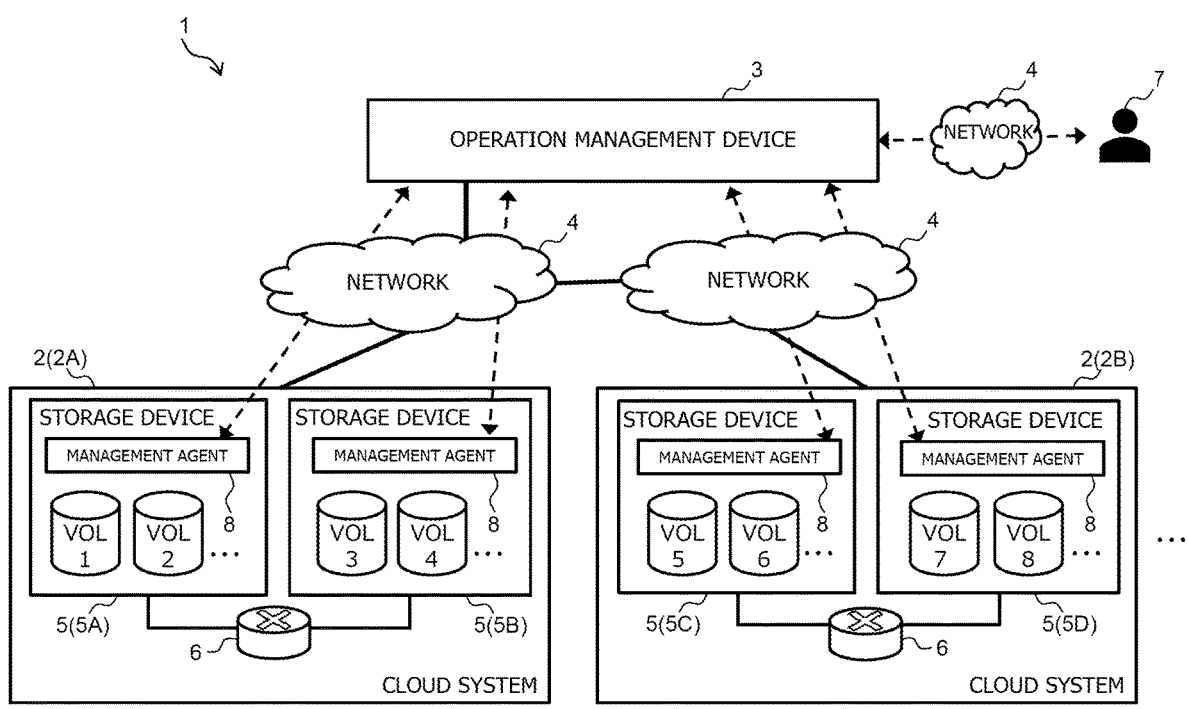
FIG. 1 is a block diagram depicting an entire configuration of an information processing system according to the present embodiment.

An embodiment of the present invention will be hereinafter described in detail with reference to the drawings.

Note that the invention as claimed in the appended claims is not limited to the embodiment described below. All combinations of elements described in the embodiment are not necessarily required as means for solution achieved by the invention.

In addition, various types of information will be expressed as a "table," a "database," a "list," or the like in the following description in some cases. However, each of the respective types of information may be expressed using a data structure other than a table, a database, a list, or the like. Accordingly, each of a "xxx table," a "xxx database," a "xxx list," and the like will be referred to as "xxx information" in some cases to indicate no dependency on the form of the data structure.

Moreover, expressions such as "identification information," an "identifier," a "name," an "appellation," and an "ID" will be presented in the following description to explain contents of respective types of information. However, these expressions are replaceable with each other to express the corresponding contents.

Furthermore, some processes in the following description are expressed as processes performed by a program, or a function unit embodied by executing a program using a processor. However, a program is actually executed by a processor (e.g., central processing unit (CPU)) to achieve a predetermined process using a storage resource (e.g., memory), a communication I/F, and a port. Accordingly, these processes may be expressed as processes performed by a processor. In addition, processes performed by a program in the description may be defined as processes performed by hardware such as a computer including a processor (e.g., an operation management device or a storage device), and a "controller" mounted on a computer.

Moreover, a program in the following description may be installed into respective computers from a program source (e.g., a program distribution server, a storage medium readable by a computer). In this case, the program distribution server includes a CPU and a storage resource. The storage resource further stores a distribution program and a program to be distributed. In addition, a CPU of the program distribution server distributes the program to be distributed to other computers by executing the distribution program.

Furthermore, a volume in the following description is not limited to a physical storage region, but may be a logical storage region. In addition, a "pool" is a logical storage region (e.g., a set of a plurality of pool volumes), and may be prepared for each use purpose. For example, at least either one type of a TP pool and a snapshot pool may be provided as the pool. The TP pool may be a storage region constituted by a plurality of pages (substantive storage regions).

In a case where no page is allocated to a virtual region (a virtual region of a TP volume) to which an address designated by a write request received from a host device belongs, a storage controller allocates a page to this virtual region (write destination virtual region) from the TP pool (a page may be newly allocated to the write destination virtual region even if a page is already allocated to the write destination virtual region).

The storage controller may write data to the allocated page as write target data attached to the write request. The snapshot pool may be a storage region where data migrated from an original volume is stored. One pool may be used for both the TP pool and the snapshot pool. The "pool volume" may be a volume corresponding to a constituent element of the pool.

(1) Configuration of Information Processing System of Present Embodiment

FIG. 1 depicts an overall configuration example of an information processing system 1 according to the present embodiment. The information processing system 1 in this configuration example includes a plurality of cloud systems 2 (first cloud system 2A, second cloud system 2B, and others), and an operation management device 3. Moreover, connection between the respective cloud systems 2, and connection between the respective cloud systems 2 and the operation management device 3 are each achieved in a freely communicable manner via a network 4 such as the Internet.

Each of the cloud systems 2 includes a plurality of storage devices 5. The respective storage devices 5 are connected to each other in a freely communicable manner via an internal network 6. It is assumed hereinafter that the first cloud system 2A includes first and second storage devices 5A and 5B, and that the second cloud system 2B includes third and fourth storage devices 5C and 5D.

Each of the storage devices 5 may be constructed either as a physical storage device including information processing resources such as a CPU, a memory, and a hard disk device, or as a logical storage device such as an SDS. The storage device 5 provides volumes VOL (VOL1, VOL2, and others) for a user as storage regions, and reads and writes data from and to the volumes VOL in response to a request from the user.

It is assumed hereinafter that the first storage device 5A includes the first and second volumes VOL1 and VOL2, that the second storage device 5B includes third and fourth volumes VOL3 and VOL4, that the third storage device 5C includes fifth and sixth volumes VOL5 and VOL6, and that the fourth storage device 5D includes seventh and eighth volumes VOL7 and VOL8.

The volumes VOL may be either storage regions each having a substantive capacity, or storage regions each having a virtual capacity to which a physical storage region is dynamically allocated according to data reading and writing. For example, a data storage region (volume) adopting thick provisioning may be applied to the storage region having a substantive capacity, while a data storage region (volume) adopting thin provisioning may be applied to the data storage region having a virtual capacity.

The respective storage devices 5 are connected to the operation management device 3 via the networks 4. A system manager 7 of the information processing system 1 operates the operation management device 3 via the network 4.

A management agent 8 is mounted on each of the storage devices 5. Each of the management agents 8 transmits, to the operation management device 3, various types of information such as configuration information, running information, performance information, and capacity information associated with the storage device 5 where the management agent 8 is running (hereinafter this storage device will be referred to as an own storage device for the corresponding management agent), and changes a setting and a configuration of the own storage device 5 according to an instruction from the operation management device 3.

Each of the management agents 8 may be mounted as software within the corresponding storage device 5, or may be mounted on a management controller independently provided as hardware, such as a baseboard microcomputer (BMC).

The operation management device 3 regularly collects the foregoing various types of information associated with the respective storage devices 5, such as the configuration information and the running information, from the respective storage devices 5 of the respective cloud systems 2 via the network 4, and monitors states of the respective storage devices 5 on the basis of these collected items of information. Note that the information such as the configuration information and the running information associated with the respective storage devices 5 may be regularly transmitted from the respective storage devices 5 to the operation management device 3, rather than actively collected by the operation management device 3.

The operation management device 3 may be constituted by a physical server device including information processing resources such as a CPU, a memory, and a hard disk device, or may be constituted by SaaS operating in a cloud, or software running in a physical server device.

Figure 2:
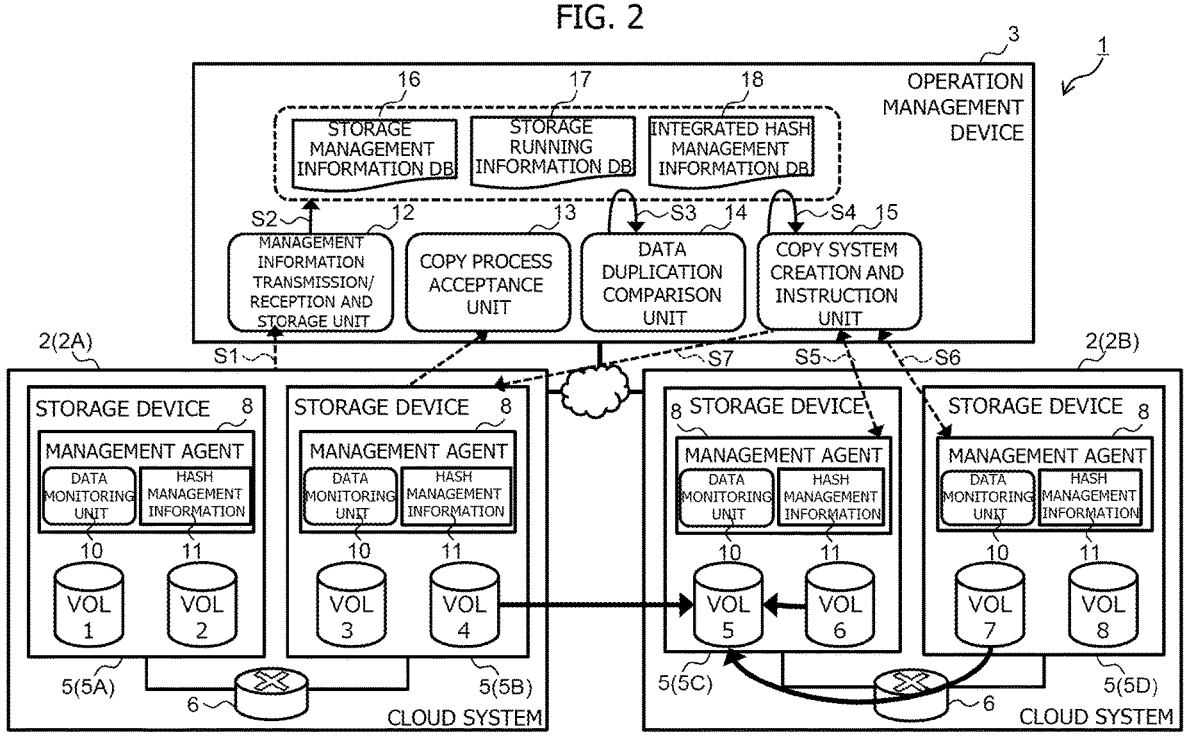
FIG. 2 is a block diagram depicting a logical configuration of the information processing system of the present embodiment in a case where each storage device is constituted by a block storage device.

FIG. 2 depicts a logical configuration of the information processing system 1 of the present embodiment concerning a volume copy process for copying all data of the volume VOL within one of the storage devices 5 included in one of the cloud systems 2 to the volume VOL within one of the storage devices 5 included in a different one of the cloud systems 2 in a case where each of the storage devices 5 of the information processing system 1 of the present embodiment is a block storage device which reads and writes data in units of a chunk.

As depicted in FIG. 2, each of the management agents 8 mounted on the respective storage devices 5 includes a data monitoring unit 10. The data monitoring unit 10 is a function unit which has a function of regularly executing a process for obtaining hash values of data stored in the respective volumes VOL within the own storage device 5 using a hash function in units of a data string stored in one chunk (hereinafter this data string will be referred to as a chunk data string).

Examples applicable to the hash function used by the data monitoring unit 10 in this case include a hash function based on a hash algorithm such as secure hash algorithm (SHA)-1, SHA-2, and message digest (MD) 5, and a method using a specific part of a chunk data string. The data monitoring unit 10 stores calculated hash values in units of a chunk in a hash management information table 11 in association with logical addresses each indicating a chunk position where a corresponding data string is stored, and manages the hash values thus stored.

Note that each of the storage devices 5 generally has a mechanism which calculates a hash value unique to a chunk data string using a hash function or the like, and stores and manages the calculated hash value in a hash table or an address table in association with a logical address of a chunk where a chunk data string corresponding to the hash value is stored so as to identify unique value data for each chunk data string in a case where the storage devices 5 each have a data duplication elimination function or a snapshot function, for example. In this case, this mechanism may be used instead of the data monitoring unit 10 and the hash management information table 11.

The hash value obtained for each chunk data string and stored in the hash management information table 11 is regularly transmitted to the operation management device 3 as hash management information using the management agent 8 together with information such as the configuration information and the running information associated with the corresponding storage device 5 (S1).

In this case, the hash management information transmitted to the operation management device 3 may be constituted by a hash value itself for each chunk data string. However, according to the present embodiment, for compression of the information amount of hash management information, it is assumed that hash values of respective chunk data string stored in the volume VOL are converted into data in a data format called as one bucket value and transmitted in this form to the operation management device 3 as hash management information associated with the corresponding volume VOL. The "bucket value" is data in a data format representing a probability of presence of any hash value and generated on the basis of a set of the hash values described above using a statistical different estimation algorithm called as HyperLogLog, for example. In this manner, the information amount of the hash management information to be managed by the operation management device 3 can be considerably reduced.

On the other hand, the operation management device 3 includes, as function units, a management information transmission/reception and storage unit 12, a copy process acceptance unit 13, a data duplication comparison unit 14, and a copy system creation and instruction unit 15, and further includes, as databases, a storage management information database 16, a storage running information database 17, and an integrated hash management information database 18.

The management information transmission/reception and storage unit 12 is a function unit which has a function of transmitting and receiving management information and commands between the respective storage devices 5, and storing received management information in the corresponding database.

Practically, the management information transmission/reception and storage unit 12 stores the configuration information associated with the respective storage devices 5 and collected from the respective storage devices 5 in the storage management information database 16 as storage management information, and stores the running information in the storage running information database 17. Moreover, the management information transmission/reception and storage unit 12 stores the hash management information transmitted from the management agents 8 of the respective storage devices 5 together with the foregoing items of information in the integrated hash management information database 18 (S2).

The copy process acceptance unit 13 is a function unit which has a function of accepting a copy process request transmitted in units of a volume from each of the storage devices 5, and giving the accepted copy process request to the data duplication comparison unit 14. Note that the copy process request contains a volume number of a volume of a copy source (hereinafter this volume will be referred to as a copy source volume) VOL, a product number indicating the storage device 5 including the copy source volume VOL, a volume number of a volume of a copy destination (hereinafter this volume will be referred to as a copy destination volume) VOL, a product number indicating the storage device 5 including the copy destination volume VOL, and hash management information associated with the copy destination volume VOL.

The data duplication comparison unit 14 is a function unit which has a function of comparing hash management information associated with the copy source volume VOL and hash management information stored in the integrated hash management information database 18 in response to the copy process request given from the copy process acceptance unit 13. The data duplication comparison unit 14 determines, on the basis of this comparison, whether or not a part of data stored in the copy source volume VOL (chunk data string) is duplicated with a part of data stored in the different volumes VOL (S3).

In this case, the "hash management information associated with the different volumes VOL" compared with the "hash management information associated with the copy source volume VOL" by the data duplication comparison unit 14 is hash management information associated with each of the volumes VOL which are contained in the cloud system 2 including the storage device 5 having the copy destination volume VOL, and are other than the copy destination volume VOL.

For example, as depicted in FIG. 2, in a case of a volume copy for copying all data of the fourth volume VOL 4 within the second storage device 5B of the first cloud system 2A to the fifth volume VOL5 of the third storage device 5C of the second cloud system 2B, the data duplication comparison unit 14 compares the hash management information associated with the fourth volume VOL4 and given from the copy process acceptance unit 13 with the hash management information associated with each of the sixth to eighth volumes VOL6 to VOL8 included in the third and fourth storage device 5C and 5D within the second cloud system 2B and stored in the integrated hash management information database 18.

According to the present embodiment, bucket values are used as the hash management information as described above. Accordingly, it is probabilistically derived, on the basis of the foregoing comparisons, whether or not a part of data stored in the copy source volume VOL (chunk data string) is duplicated with a part of data stored in the volumes VOL which are contained in the cloud system 2 including the storage device 5 having the copy destination volume VOL and are other than the copy destination volume VOL. Note that this system generally contains a certain level of false positive.

The copy system creation and instruction unit 15 is a function unit which has a function of creating (determining) a plan of a data copy from the copy source volume VOL to the copy destination volume VOL (hereinafter this plan will be referred to as a data copy plan). In a case of determination that data having the same contents as those of a part of data corresponding to the copy target (a part of the chunk data string stored in the copy source volume VOL) (hereinafter this data having the same contents will be referred to as duplicate data) is stored in any of the volumes VOL which are contained in the cloud system 2 to which the storage device 5 having the copy destination volume VOL belongs and are other than the copy destination volume VOL on the basis of a determination result of the above determination made by the data duplication comparison unit 14, the copy system creation and instruction unit 15 creates a data copy plan for copying this duplicate data from the corresponding volume VOL to the copy destination volume VOL (S4).

This data copy plan contains a specific copy instruction command designating which data is to be copied and to which position within the copy destination volume VOL the corresponding data is to be copied, and a copy order. The copy order is determined, in consideration of copy cost, such that copying is initially performed within the storage device 5 including the copy destination volume VOL, then performed within the cloud system 2 to which the corresponding storage device 5 belongs, and finally performed from the copy source volume VOL to the copy destination volume VOL.

Thereafter, the copy system creation and instruction unit 15 transmits a copy process request to the corresponding storage device 5 in such a manner as to execute a copy process in the determined copy order in accordance with the created data copy plan.

For example, in a case where the data duplication comparison unit 14 obtains, as the foregoing determination result, such a determination result that duplicate data of the fifth volume VOL5 as the copy destination volume is present in the sixth volume VOL6 in the example of FIG. 2, the copy system creation and instruction unit 15 initially transmits a copy process request to the third storage device 5C (S5). Accordingly, in a case where the duplicate data is present in the sixth volume VOL6, this duplicate data is copied from the sixth volume VOL6 to the fifth volume VOL5. In this situation, in a case where the duplicate data is absent in the sixth volume VOL6 for a reason that the determination result obtained by the data duplication comparison unit 14 is false positive, for example, the management agent 8 of the third storage device 5C notifies the copy system creation and instruction unit 15 of the operation management device 3 of this fact.

Thereafter, in a case where the data duplication comparison unit 14 obtains such a determination result that duplicate data is present in the seventh and/or eighth volume VOL7 or VOL8, the copy system creation and instruction unit 15 transmits a copy process request to the fourth storage device 5D (S6). Accordingly, in a case where the duplicate data is stored in the seventh volume VOL7 or the eighth volume VOL8, the duplicated data is copied to the fifth volume VOL5 by storage device-to-device copying between the third storage device 5C and the fourth storage device 5D. In this situation, in a case where the duplicate data is absent in the seventh and eighth volume VOL7 and VOL8, the management agent 8 of the fourth storage device 5D similarly notifies the copy system creation and instruction unit 15 of the operation management device 3 of this fact.

Thereafter, the copy system creation and instruction unit 15 transmits a copy process request to the second storage device 5B, according to the received processing results in steps S5 and S6 (S7). As a result, all data included in the data stored in the fourth volume VOL4 and not subjected to the copy process is copied to the fifth volume VOL5 (S7).

The copying in this case is achieved by data copy from the first cloud system 2A to the second cloud system 2B. Accordingly, outbound communication is required by the first cloud system 2A, and therefore costs are produced according to a communication data amount. However, the copy process performed in steps S5 and S6 can reduce the movement data amount in comparison with a case where all data stored in the fourth volume VOL4 is moved from the first cloud system 2A to the second cloud system 2B.

After completion of this copy process, the third storage device 5C executes a consistency check for data stored in the fifth volume VOL5 and compares a result of the check with a result of the data stored in the fourth volume VOL4 so as to check whether or not the contents of the fourth volume VOL4 have been correctly copied to the fifth volume VOL5. A method for checking this consistency may be a method using cyclic redundancy check (CRC), or a method based on a hash function.

Figure 3:
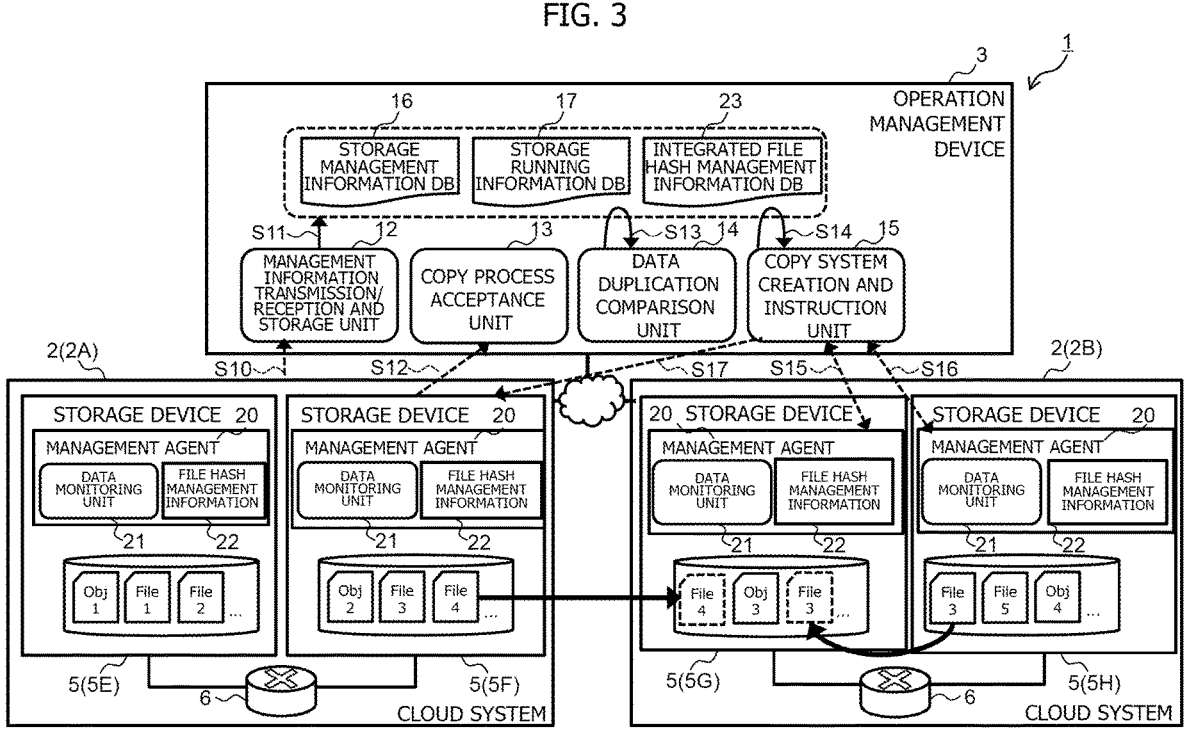
FIG. 3 is a block diagram depicting a logical configuration of the information processing system of the present embodiment in a case where each storage device is constituted by a file/object storage device.

On the other hand, FIG. 3 which includes parts given numerical numbers identical to the corresponding parts in FIG. 2 depicts a logical configuration of the information processing system 1 of the present embodiment for performing a file copy process which copies one or a plurality of files and/or objects stored in the storage device 5 of one of the cloud systems 2 to one of the storage device 5 of a different one of the cloud systems 2 in a case where each of the storage devices 5 of the information processing system 1 of the present embodiment is a file/object storage device which reads and writes data in units of a file or an object. In addition, it is assumed in the following description that each of the files and the objects expresses a unit as a set of data strings, and is handled as an item substantially equivalent to each other.

In this case, a management agent 20 of each of the storage devices 5 (file/object storage devices in the description with reference to FIG. 3) includes a data monitoring unit 21. In addition, the data monitoring unit 21 has a function of regularly obtaining, using a hash function, a characteristic value (hash value) on the basis of which data contents are identifiable in units of a file and an object for each of the files and the objects stored in the own storage device 5.

In this case, a hash function based on a hash algorithm, such as SHA-1, SHA-2, and MD5, is applicable to the hash function used by the data monitoring unit 21 similarly to the case in FIG. 2. Alternatively, the hash value may be obtained using a specific part of data strings constituting a file and an object.

The data monitoring unit 21 stores hash values calculated for each of files and objects in a file hash management table 22, and manages the stored hash values. The file hash management information table 22 constitutes a table for managing corresponding hash values for each of files and objects, and attribute values such as names and sizes of the corresponding files and object.

Note that each of the storage devices 5 generally has a mechanism which calculates a hash value unique to data using a hash function or the like, and manages the calculated hash value in association with a file and an object corresponding to the hash value so as to identify data for each file or object in a case where the storage devices 5 each have a data duplication elimination function or a snapshot function, for example. In this case, this mechanism may be used instead of the data monitoring unit 21 and the file hash management information table 22.

The hash value obtained for each file and object and stored in the file hash management information table 22 is regularly transmitted to the operation management device 3 as file hash management information using the management agent 20 together with necessary information such as the configuration information and the running information associated with the corresponding storage device 5 (S10).

In this case, the file hash management information transmitted to the operation management device 3 may be constituted by a hash value itself for each file and object. However, according to the present embodiment, for compression of the information amount of file hash management information, it is assumed that the file hash management information is transmitted to the operation management device 3 as a bucket value indicating a probability that any file hash value is present in the own storage device 5. In this manner, the information amount of the file hash management information to be managed by the operation management device 3 can be considerably reduced.

The operation management device 3 includes, as function units, the management information transmission/reception and storage unit 12, the copy process acceptance unit 13, the data duplication comparison unit 14, and the copy system creation and instruction unit 15, and further includes, as databases, the storage management information database 16, the storage running information database 17, and an integrated file hash management information database 23.

The management information transmission/reception and storage unit 12 of the operation management device 3 stores the configuration information associated with the respective storage devices 5 and transmitted from the respective storage devices 5 in the storage management information database 16 as storage management information, and stores the running information in the storage running information database 17. Moreover, the management information transmission/reception and storage unit 12 stores the file hash management information for each file and object transmitted from the respective storage devices 5 together with these items of information in the integrated file hash management information database 23 (S11).

Thereafter, in a case where any file or object stored in one of the storage devices 5 of one of the cloud systems 2 is copied to one of the storage devices 5 within a different one of the cloud systems 2, the information processing system 1 depicted in FIG. 3 transmits, to the operation management device 3, file hash management information associated with the corresponding file or object from the storage device 5 as the copy source retaining the file or object corresponding to the copy target (the storage device 5 as the copy source will be hereinafter referred to as the copy source storage device 5) together with a copy process request (S12).

For example, in a case where a file stored in a second storage device 5F is copied to a third storage device 5G in the example depicted in FIG. 3, the second storage device 5F transmits file hash management information associated with this file to the copy process acceptance unit 13 of the operation management device 3 together with a copy process request.

The copy process acceptance unit 13 gives the file hash management information associated with the received copy target file or object to the data duplication comparison unit 14. Moreover, the data duplication comparison unit 14 compares the file hash management information given from the copy process acceptance unit 13 with file hash management information associated with respective files and respective objects stored in the different storage devices 5 and stored in the integrated file hash management information database 23, and determines whether or not the copy target file or object is duplicated with (identical to) the file or the object stored in any one of the storage devices 5 within the cloud system 2 to which the storage device 5 of the copy destination (hereinafter, the storage device 5 of the copy destination will be referred to as the copy destination storage device 5) belongs (S13).

For example, in the case of the example depicted in FIG. 3, the data duplication comparison unit 14 determines whether or not the copy target file or object stored in the second storage device 5F is duplicated with any one of files or objects stored in the third storage device 5G, or any one of files or objects stored in the fourth storage device 5H.

Note that a bucket value is used as file hash management information in the present embodiment as described above. Accordingly, for example, it is probabilistically derived whether or not a file or an object having any file hash value associated with a file or an object corresponding to a copy target is duplicated with a file or an object stored in the copy destination storage device 5, or stored in any one of the different storage devices 5 running in the same cloud system 2 as the cloud system 2 of the copy destination storage device 5. Accordingly, a certain level of false positive is generally contained.

Subsequently, the copy system creation and instruction unit 15 creates a copy plan for copying a file or an object from the copy source storage device 5 to the copy destination storage device 5 (hereinafter this plan will be referred to as a file copy plan). At this time, in a case where it is clarified that the file or the object corresponding to the copy target is stored in any one of the storage devices 5 which are contained in the cloud system 2 to which the copy destination storage device 5 belongs and are other than the copy destination storage device 5 on the basis of the determination result of the above determination made by the data duplication comparison unit 14, the copy system creation and instruction unit 15 creates a file copy plan for copying this file or object from the corresponding storage device 5 to the copy destination storage device 5.

The file copy plan contains a specific copy instruction command designating which file or object corresponds to the copy target and to which data region within the copy destination storage device 5 the file or the object is to be copied, and contains a copy order. The copy order is determined, in consideration of copy cost, in such a manner as to initially perform copying within the cloud system 2 to which the copy destination storage device 5 belongs, and then copy the copy target file or object from the copy source storage device 5 to the copy destination storage device 5 after excluding the copy target file or object present in the copy destination storage device 5 from the copy target.

Thereafter, the copy system creation and instruction unit 15 transmits a copy process request to the corresponding storage device 5 so as to execute the copy process in the determined copy order in accordance with the created file copy plan.

For example, in a case where the data duplication comparison unit 14 obtains such a determination result that a file and/or an object identical to the file and/or the object corresponding to the copy target is present in the third storage device 5G as the above determination result in the example of FIG. 3, the copy system creation and instruction unit 15 causes the third storage device 5G to check agreement between the copy target file and/or object and the respective files and/or the respective objects stored in the corresponding third storage device 5G, and excludes the agreeing file or object from the copy target (S15).

Subsequently, in a case where the data duplication comparison unit 14 obtains such a determination result that the copy target file and/or object is present in the fourth storage device 5H as the above determination result, the copy system creation and instruction unit 15 transmits a copy process request to the fourth storage device 5H (S16). In this manner, in a case where a file or an object identical to the copy target file or object is present in the fourth storage device 5H, this copy target file or object is copied from the fourth storage device 5H to the third storage device 5G. At this time, in a case where this file and/or object is absent in the fourth storage device 5H for a reason that the determination result obtained by the data duplication comparison unit 14 is false positive, for example, the management agent 20 of the fourth storage device 5H notifies the copy system creation and instruction unit 15 of the operation management device 3 of this fact.

Thereafter, the copy system creation and instruction unit 15 transmits a copy process request to the second storage device 5F, according to the processing results received in steps S15 and S16 (S17). As a result, all files and/or objects included in the files and/or the objects corresponding to the copy target and not yet subjected to the copy process are copied from the second storage device 5F to the third storage device 5G (S17).

The copying in this case is file copying from the first cloud system 2A to the second cloud system 2B. Accordingly, outbound communication is required by the first cloud system 2A, and therefore costs are produced according to a communication data amount. However, the copy process performed in steps S15 and S16 can reduce the transfer data amount in comparison with a case where data of the copy target file and/or object is transferred from the second storage device 5F to the third storage device 5G.

(2) Configuration of Various Databases Managed by Operation Management Device

Subsequently described will be a configuration of a database group managed by the operation management device 3 to execute the copy control process described above (hereinafter this group will be collectively referred to as an operation management device management information database group). Note that described hereinafter will be a case where the cloud system 2 constituted by only block storage devices, and the cloud system 2 constituted by only file/object storage devices are mixed in the information processing system 1. In this case, the operation management device 3 is allowed to execute both the copy control process described above with reference to FIG. 2, and the copy control process described above with reference to FIG. 3.

Figure 4:
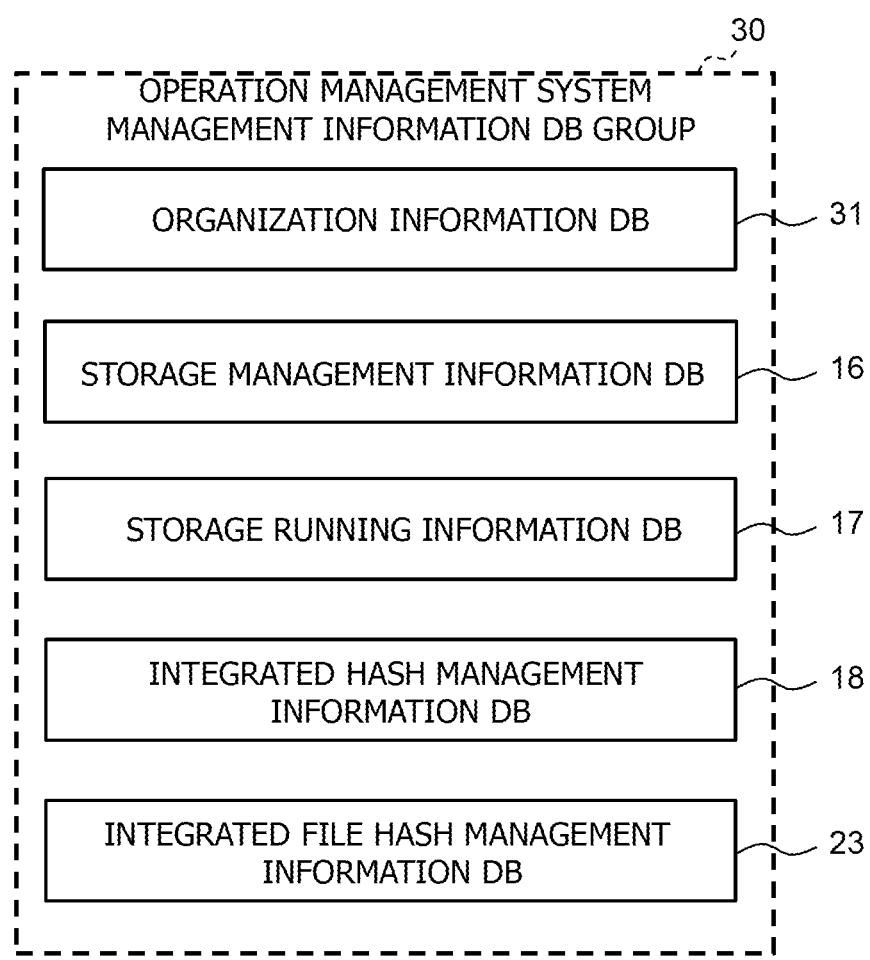
FIG. 4 is a conceptual diagram depicting a configuration of an operation management system management information database group.

FIG. 4 depicts a configuration of the operation management device management information database group 30 managed by the operation management device 3 thus configured. As depicted in FIG. 4, the configuration of the operation management device management information database group 30 includes an organization information database 31, and the storage management information database 16, the storage running information database 17, the integrated hash management information database 18, and the integrated file hash management information database 23 each described above with reference to FIGS. 2 and 3.

The organization information database 31 is a database used for the purpose of managing users as an organization, who use services offered by the operation management device 3, such as the copy control process described above.

The organization information database 31 herein has a table structure including an organization ID column 31A, an organization code column 31B, an organization type column 31C, an organization name column 31D, and a contractual situation column 31E as depicted in FIG. 5. In the organization information database 31, one entry corresponds to one organization.

In addition, an identifier (organization ID) of a corresponding organization currently registered is stored in the organization ID column 31A, while an organization code allocated to the corresponding organization and unique to the corresponding organization is stored in the organization code column 31B. Moreover, a type of the corresponding organization (organization type) is stored in the organization type column 31C. Examples of the organization type include "customer" for use by a customer, and "partner" for use by an associated company.

Furthermore, a name of the corresponding organization is stored in the organization name column 31D, while a contractual situation indicating activation of a contract for allowing the corresponding organization to use a service provided by the operation management device is stored in the contractual situation column 31E. Examples of the contractual situation include "active" indicating that the contract is active, and "inactive" indicating that the contract is inactive due to expiration of a term of activation or the like.

Accordingly, in the case of the example depicted in FIG. 5, an organization code "OrgA" given an organization ID "011" has an organization type "customer," an organization name "N.Bank," and a contractual situation of "active."

Moreover, the storage management information database 16 is a database used for the purpose of managing information associated with the storage devices 5 owned or used by the respective organizations, and has a table structure containing an organization ID column 16A, a product number column 16B, a storage type column 16C, a model name column 16D, a firmware version column 16E, a storage name column 16F, a location information column 16G, and a storage state column 16H as depicted in FIG. 6. In the storage management information database 16, one entry corresponds to the one storage device 5 owned or used by one organization.

In this configuration, a corresponding organization ID is stored in the organization ID column 16A. This organization ID corresponds to the organization ID of the organization information database 31 described above with reference to FIG. 5. Moreover, a product number of the storage device 5 owned or used by the organization is stored in the product number column 16B, while a storage type of the storage device 5 is stored in the storage type column 16C. Examples of the storage type include "SDS block" which is the storage device 5 constituted by a software block storage device and not having hardware, "SDS file" which is the storage device 5 constituted by a software file storage device and not having hardware, "block" which is the storage device 5 constituted by a block storage device having hardware, and "file" which is the storage device 5 constituted by a file storage device and having hardware.

A model name, a firmware version, and a name of the corresponding storage device 5 are stored in the model name column 16D, the firmware version column 16E, and the storage name column 16F, respectively, while identification information, such as the name of the cloud system 2 where the corresponding storage device 5 is installed or disposed, is stored in the location information column 16G. In addition, a current state of the corresponding storage device 5 is stored in the storage state column 16H. Examples of the current state of the storage device 5 include "online" which is an online state, and "offline" which is an offline state.

Accordingly, in the case of the example depicted in FIG. 6, the storage device 5 having a product number "20080" and belonging to an organization having an organization ID "001," for example, is a storage device of a storage type "SDS block," and having a model name "aaaa," a firmware version "V1.2," and a name "Storage A," and is provided in the cloud system 2 called as "Cloud A" and in a current state "online."

Note that the information stored in the storage management information database 16 is appropriately updated by the management information transmission/reception and storage unit 12 of the operation management device 3 on the basis of configuration information and running information associated with the storage device 5 and acquired by regular communication between the management information transmission/reception and storage unit 12 and the management agents 8 or 20 of the respective storage devices 5, or communication on an event-driven basis.

The integrated hash management information database 18 is a database used for the purpose of retaining and integratedly managing hash management information regularly transmitted from the respective storage devices 5 which are block storage devices in view of the storage type and included in the information processing system 1.

FIG. 7A depicts a configuration of the integrated hash management information database 18 in a case where the hash management information described above is constituted by hash values for each chunk. In this case, the integrated hash management information database 18 has a table structure containing a product number column 18AX and a hash value column 18BX. In the integrated hash management information database 18 thus configured, one value in the product number column 18AX corresponds to the one storage device 5 which is a block storage device in view of the storage type and present within the information processing system 1 of the present embodiment.

In addition, a product number of the corresponding storage device 5 is stored in the product number column 18AX. Moreover, one value is given for each of chunks present in the corresponding storage device 5 in association with each other in the hash value column BX, and each hash value calculated for a corresponding chunk data string stored in a corresponding chunk is stored in the hash value column 18BX thus configured. Note that the values in the hash value column 18BX are arranged in an order of logical addresses given to the corresponding chunks. Accordingly, in the case of the example depicted in FIG. 7A, it is indicated that a hash value of a chunk data string stored in a chunk at a first logical address of the storage device 5 having a product number "20080" is "7726f55012e1e26cc762c9982e7c6c54ca7bb303," for example.

In addition, FIG. 7B depicts a configuration of the integrated hash management information database 18 in a case where the hash management information is constituted by bucket values. In this case, the integrated hash management information database 18 has a table structure containing a product number column 18AY and a bucket value column 18BY as depicted in FIG. 7B. In the integrated hash management information database 18, one entry corresponds to the one storage device 5 which is a block storage device in view of the storage type and present within the information processing system 1 of the present embodiment.

In addition, a product number of the corresponding storage device 5 is stored in the product number column 18AY. Moreover, one bucket value is given in association with the one storage device 5 in the bucket value column 18BY. Each bucket value calculated for the corresponding storage device 5 is stored in the bucket value column 18BY thus configured. Accordingly, in the case of the example depicted in FIG. 7B, it is indicated that a bucket value of the storage device having a product number "20080" is "{12, 62086, 92019, and up to 672819, 27118, 272828}," for example.

According to the present embodiment, the hash management information is constituted by bucket values as described above. Accordingly, the operation management device 3 retains the integrated hash management information database 18 depicted in FIG. 7B.

Note that the information stored in the integrated hash management information database 18 is appropriately updated by the management information transmission/reception and storage unit 12 of the operation management device 3 on the basis of hash management information acquired by regular communication between the management information transmission/reception storage unit 12 and the management agents 8 of the corresponding storage devices 5 and communication on an event-driven basis.

Moreover, the integrated file hash management information database 23 is a database for integratedly managing file hash management information regularly transmitted from the respective storage devices 5 which are file storage devices in view of the storage type present within the information processing system 1.

Figure 8A:
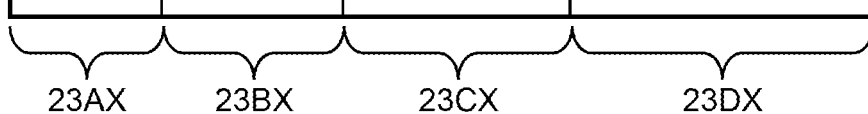
FIG. 8A is a chart presenting a configuration example of an integrated file hash management information database in a case where the hash management information is constituted by hash values.

FIG. 8A depicts a configuration of the integrated file hash management information data base 23 in a case where the file hash management information described above is constituted by hash values for each file and each object. In this case, the integrated file hash management information database 23 has a table structure containing a product number column 23AX, a file name column 23BX, a file size column 23CX, and a hash value column 23DX. In the integrated file hash management information database 23 in this case, one value in the product number column 23AX corresponds to the one storage device 5 which is a file storage device in view of the storage type and present within the information processing system 1 of the present embodiment.

In addition, a product number of the corresponding storage device 5 is stored in the product number column 23AX. Moreover, each value of the file name column 23BX, the file size column 23CX, and the hash value column 23DX is given in association with the corresponding one of the files stored in the corresponding storage device 5. Furthermore, a file name of the corresponding file is stored in the file name column 23BX, a file size of the corresponding file is stored in the file size column 23CX, and a hash value calculated for the corresponding file is stored in the hash value column 23DX.

Accordingly, in the case of the example depicted in FIG. 8A, it is indicated that a file size of a file having a file name "aaa" and stored in a file storage device having a product number "20080" is "1024 KB," and that a hash value of this file is "7726f5501 and others," for example.

Figure 8B:
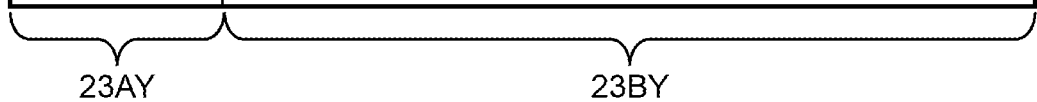
FIG. 8B is a chart presenting a configuration example of the integrated file hash management information database in a case where the hash management information is constituted by bucket values.

In addition, FIG. 8B depicts a configuration of the integrated file hash management information database 23 in a case where the file hash management information transmitted from each of the storage devices 5 is constituted by bucket values. In this case, the integrated file hash management information database 23 has a table structure containing a product number column 23AY and a bucket value column 23BY as depicted in FIG. 8B. In the integrated file hash management information database 23 in this case, one entry corresponds to the one storage device 5 which is a file storage device in view of the storage type and present within the information processing system 1 of the present embodiment.

In addition, a product number of the corresponding storage device 5 is stored in the product number column 23AY. Moreover, one bucket value is given for the one storage device 5 in the bucket value column 23BY. Each bucket value calculated for the corresponding storage device 5 is stored in the bucket value column 23BY thus configured. Accordingly, in the case of the example depicted in FIG. 8B, a bucket value of the storage device 5 having a product number "20080" is "{12, 62086, 92019, and up to 672819, 27118, 272828}," for example.

Note that the file hash management information is constituted by bucket values in the present embodiment as described above. Accordingly, the operation management device retains the integrated file hash management information database 23 depicted in FIG. 8B.

The information stored in the integrated file hash management information database 23 is also appropriately updated by the management information transmission/reception and storage unit 12 of the operation management device 3 on the basis of file hash management information acquired by regular communication between the management information transmission/reception storage unit 12 and the management agents 20 (FIG. 3) of the corresponding storage devices 5 and communication on an event-driven basis.

Figure 9A:
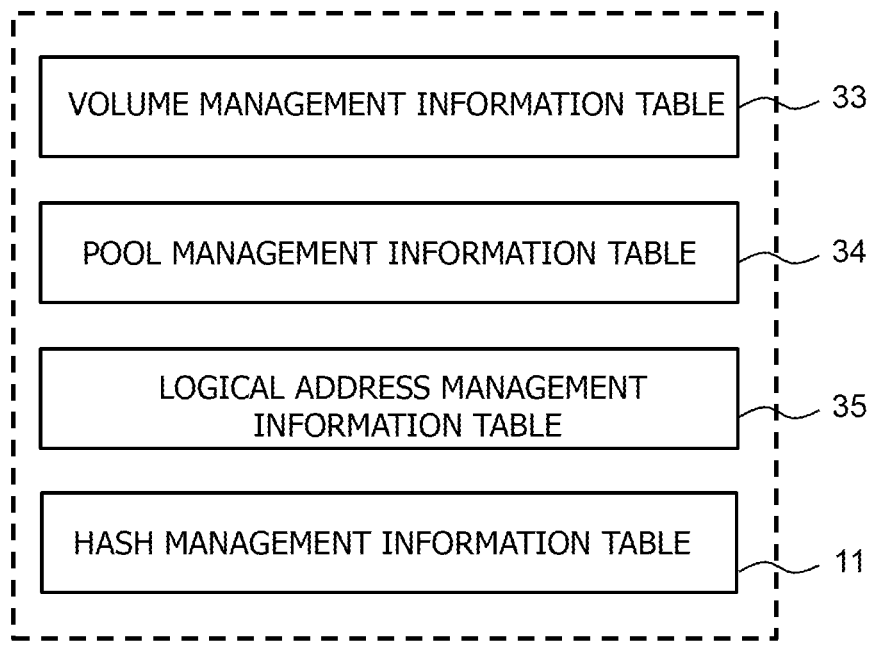
FIG. 9A is a conceptual diagram depicting a configuration example of a storage unique management information table group in a case where each storage device is a block storage.
Figure 9B:
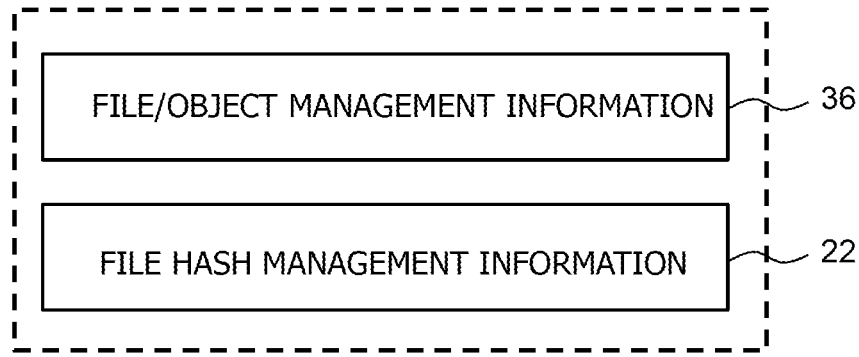
FIG. 9B is a conceptual diagram depicting a configuration example of the storage unique management information group in a case where each storage device is a file/object storage device.

On the other hand, FIGS. 9A and 9B depict storage unique manage information table groups 32A and 32B, respectively, where various types of management information unique to the corresponding storage devices 5 and managed by the respective storage devices 5 are stored. FIG. 9A depicts the configuration of the storage unique management information table group 32A managed by the management agent 8 (FIG. 2) of the storage device 5 which is a block storage in view of the storage type, while FIG. 9B depicts the configuration of the storage unique management information table group 32B managed by the management agent 20 (FIG. 3) of the storage device 5 which is a file storage in view of the storage type.

As depicted in FIG. 9A, the storage unique management information table group 32A managed by the management agent 8 of the storage device 5 which is a block storage in view of the storage type is constituted by a volume management information table 33, a pool management information table 34, a logical address management information table 35, and the hash management information table 11 described above with reference to FIG. 2.

The volume management information table 33 is a table used for the purpose of managing the volumes VOL defined within the corresponding storage device 5, and includes a volume number column 33A, a volume capacity column 33B, a data reduction activation column 33C, and a pool number column 33D as depicted in FIG. 10. In the volume management information table 33, one entry corresponds to the one volume VOL defined within the corresponding storage device 5.

In addition, a number (volume number) given to the corresponding volume VOL and unique to the corresponding volume VOL is stored in the volume number column 33A, while a capacity of the corresponding volume VOL is stored in the volume capacity column 33B. The capacity of the volume VOL is a total capacity of storage regions in a case where the corresponding volume VOL has physical storage regions. However, in a case where the corresponding volume VOL is a virtual volume having no physical storage region, a virtual capacity defined for the corresponding volume VOL is stored.

Moreover, stored in the data reduction activation column 33C is information indicating whether or not application of a data reduction function (e.g., a function for reducing a data amount of stored data, such as a data compression function and a data duplication elimination function) is activated for the corresponding volume VOL. According to the example depicted in FIG. 10, "activated" is stored in a case where application of this data reduction function is activated, and "inactivated" is stored in a case where application of this data reduction function is inactivated.

Moreover, stored in the pool number column 33D is an identification number (pool number) indicating a pool associated with the corresponding volume VOL (a pool to which a physical storage region is dynamically allocated in the corresponding volume VOL) in a case where the corresponding volume VOL is a virtual volume having no physical storage region. Furthermore, in a case where the corresponding volume VOL is a volume having a physical storage region, no pool is associated with the corresponding volume VOL. In this case, "N/A" indicating that no associated pool is present is stored.

Accordingly, in the case of the example depicted in FIG. 10, it is indicated that the volume VOL given a volume number "1" is a virtual volume having a volume capacity "1 TB," and is associated with a pool having a pool number "1" and in a state where application of the data reduction function has been set to "inactivated," for example.

Figure 11:
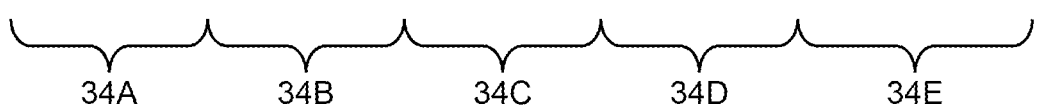
FIG. 11 is a chart presenting a configuration example of a pool management information table.

The pool management information table 34 is a table used for the purpose of managing a pool defined within the corresponding storage device 5, and includes a pool number column 34A, a pool capacity column 34B, a pool allocation capacity column 34C, a pool use capacity column 34D, and a pool volume information column 34E as depicted in FIG. 11. In the pool management information table 34, one entry corresponds to one pool defined within the corresponding storage device 5.

In addition, a number (pool number) given to the corresponding pool and unique to the corresponding pool is stored in the pool number column 34A, while a capacity of the corresponding pool is stored in the pool capacity column 34B. Moreover, stored in the pool allocation capacity column 34C is a total capacity of storage regions allocated from the corresponding pool to the volume VOL associated with the pool.

Stored in the pool use capacity column 34D is a sum total of data stored in the respective storage regions allocated from the corresponding pool to the volume VOL associated with the pool. In a case where the data amount is reduced by the data reduction function, a sum total of the data after reduction may be stored in the pool use capacity column 34D. Furthermore, stored in the pool volume information column 34E volume IDs of all the volumes VOL each constituting the corresponding pool and providing a substantial storage region.

Accordingly, in the case of the example depicted in FIG. 11, it is indicated that a pool having a pool number "1" is a pool having a pool capacity of "10 TB" and receiving storage regions provided from the volume VOL having a volume number "1," and that data of "1 TB" is stored in storage regions of "4 TB" included in the storage regions of "10 TB" and already allocated to any one or a plurality of the volumes VOL, for example.

The logical address management information table 35 is a table used for the purpose of managing various types of information associated with respective chunks given logical addresses within the corresponding storage device 5, and includes a volume number column 35A, a logical address column 35B, a reference volume number column 35C, a reference logical address column 35D, a size column 35E, a hash value column 35F, and a reference number column 35G as depicted in FIG. 12.

Values of the volume number column 35A are given in association with the respective volumes VOL defined in the own storage device 5. In addition, volume numbers given to the corresponding volumes VOL are stored in the volume number column 35A.

Moreover, values in divisions of the logical address column 35B, the reference volume number column 35C, the reference logical address column 35D, the size column 35E, the hash value column 35F, and the reference number column 35G each associated with the corresponding value in the volume number column 35A are given for each chunk within the corresponding volume VOL in association with each other.

Further stored in the logical address column 35B is a logical address of a corresponding chunk. Further stored in the reference destination volume number column 35C is a volume number of the volume VOL where data written to the corresponding chunk is actually stored. Stored in the reference logical address column 35D is a logical address of a physical chunk included in the volume VOL and allocated to the corresponding chunk.

In a case where the volume number stored in the volume number column 35A coincides with the volume number stored in the reference volume number column 35C, the corresponding volume VOL is a physical volume having a physical storage region. Data written to the corresponding volume VOL is stored in a chunk included in the corresponding volume VOL and given a logical address stored in the reference logical address column 35D.

Moreover, in a case where the volume number stored in the volume number column 35A does not coincide with the volume number stored in the reference volume number column 35C, the corresponding volume VOL is an unsubstantial virtual volume. Data written to the corresponding volume VOL is stored in a chunk which is included in the volume VOL having a volume number stored in the reference volume number column 35C, and is given a logical address stored in the reference volume number column 35D.

Further stored in the size column 35E is a size (capacity) of the chunk given the corresponding logical address, and stored in the hash value column 35F is a hash value of data stored in the corresponding chunk. Further stored in the reference number column 35G is the number of data stored in the corresponding chunk and referred to on the basis of a different logical address within the same or the different volume VOL using the data duplication elimination function, the snap function, or the like (hereinafter this number will be referred to as reference number). A reference number "0" indicates that data stored in the corresponding chunk is not referred to on the basis of a different logical address within the same or the different volume VOL (no data is shared with the different logical address). A reference number "1" or larger indicates that data stored in the corresponding chunk is referred to on the basis of a different logical address or addresses within the same or the different volume VOL (data is shared with the reference number of logical addresses).

Accordingly, in the case of the example depicted in FIG. 12, it is indicated that a chunk given a logical address "0x00000000" within the volume VOL given a volume number "1" is a substantial storage region (coincidence holds both between the volume number and the reference volume number and between the logical address and the reference logical address), and also indicated that the chunk has a size "8192" and a hash value of the data written to the corresponding chunk as a value "7726f55012e1e26 and others," and is referred to on the basis of any one of logical addresses within the same or the different volume VOL (reference number: "1"), for example.

The hash management information table 11 is a table configured for the purpose of managing hash values of data stored in respective chunks within the corresponding storage device 5 to allow reverse lookup of a volume number of the volume VOL having a corresponding chunk on the basis of a hash value as a key, or a logical address of a chunk storing corresponding data, and includes a hash value column 11A, a volume number column 11B, a logical address column 11C, and a size column 11D as depicted in FIG. 13. In the hash management information table 11, one entry corresponds to a hash value of data stored in one chunk within the corresponding storage device 5.

In addition, a hash value of corresponding data is stored in the hash value column 11A. Moreover, a volume number of the volume VOL having a chunk which stores data having this hash value is stored in the volume number column 11B, while a logical address of the corresponding chunk is stored in the logical address column 11C. A data size of the corresponding data is further stored in the size column 11D.

Accordingly, in the case of the example depicted in FIG. 13, it is indicated that data of a hash value "7726f55012e1e26 and others" is stored in a chunk given a logical address "0x00000000" within the volume VOL given a volume number "1," and that the data size of this data is "8192," for example.

On the other hand, FIG. 9B depicts the configuration of the storage unique management information table group 32B managed by the management agent 20 (FIG. 3) of the storage device 5 which is a file/object storage in view of the storage type. As depicted in FIG. 9B, the storage unique management information table group 32B described above is constituted by a file/object management information table 36, and the file hash management information table 22 described above with reference to FIG. 3.

The file/object management information table 36 is a table used for the purpose of managing respective files and respective objects stored in a corresponding file/object storage device, and includes a file/object ID column 36A, a file/object type column 36B, a file/object name column 36C, a file size column 36D, and a hash value column 36E as depicted in FIG. 14. In the file/object management information table 36, one entry corresponds to one file or one object stored in the corresponding storage device 5.

In addition, stored in the file/object ID column 36A is an identifier (file/object ID) given to a corresponding file or object and unique to the corresponding file or object. Further stored in the file/object type column 36B is a type of the corresponding file or object. According to the example depicted in FIG. 14, "file" is stored in the file/object type column in a case where the corresponding entry is a file, while "object" is stored in the file/object type column in a case where the entry is an object.

Furthermore, a name of the corresponding file or object is stored in the file/object name column 36C, while a size of the corresponding file or object is stored in the file size column 36D. In addition, a hash value calculated for the corresponding file or object is stored in the hash value column 36E.

Accordingly, in the case of the example depicted in FIG. 14, it is indicated that an entry given a file/object ID "1" has a type "file," a name "aaa," a file size "1024 KB," and a hash value "7726f55012e1e26cc and others," for example.

Figure 15:
FIG. 15 is a chart presenting a configuration example of a file hash management information table.

The file hash management information table 22 is a table configured for the purpose of managing hash values of respective files and respective objects stored in the corresponding storage device 5 to allow reverse lookup of a file/object ID of a corresponding file or object on the basis of a hash value as a key. As depicted in FIG. 15, the file hash management information table 22 thus configured includes a hash value column 22A and a file/object ID column 22B. In the file hash management information table 22, one entry corresponds to a hash value of one file or one object stored in the corresponding storage device 5.

In addition, a hash value of a corresponding file or object is stored in the hash value column 22A. Further stored in the file/object ID column 22B is a file/object ID of a file or object having the corresponding hash value.

Accordingly, in the case of the example depicted in FIG. 15, it is indicated that a file or an object having a hash value "7726f55012e1e26 and others" is a file or an object given a file/object ID "1," for example.

(3) Data Structure of Copy Process Request

FIG. 16 depicts a data structure of the above-described copy process request transmitted from the storage device 5 to the operation management device 3 when the corresponding storage device 5 requests the operation management device 3 to performing copying in units of a volume or in units of a file or an object. As depicted in this figure of FIG. 16, a copy process request 40 includes a basic information region 41, a copy source volume hash value list region 42, and a copy target file list region 43.

The basic information region 41 is a region for storing basic information associated with a requested copy process, and is used both for a case where the copy target is the volume VOL, and for a case where the copy target is a file or an object. The basic information region 41 herein includes a process management number column 41A, a copy mode column 41B, a copy source storage product number column 41C, a copy source volume number column 41D, a copy destination storage product number column 41E, and a copy destination volume number column 41F.

In addition, a number indicating a process manager of a copy currently requested (process management number) is stored in the process management number column 41A.

Moreover, a copy request type (copy mode) is stored in the copy mode column 41B. The copy mode includes a copy request in units of a volume as described above with reference to FIG. 2, and a copy request in units of a file or an object as described with reference to FIG. 3. For example, in a case of a copy request in units of a volume, information called "volume copy" is stored in the copy mode column 41B. In a case of a copy request in units of a file or an object, information called as "file copy" is stored in the copy mode column 41B.

Each of the copy source volume number column 41D and the copy source storage product number column 41C becomes activated only when the copy mode is a volume copy. In addition, a volume number of the copy source volume VOL for a requested volume copy is stored in the copy source volume number column 41D, while a product number of the storage device 5 including the copy source volume VOL is stored in the copy source storage product number 41C.

Moreover, each of the copy destination volume number column 41F and the copy destination storage product number column 41E also becomes activated only when the copy mode is a volume copy. In addition, a volume number of the copy destination volume VOL for a requested volume copy is stored in the copy destination volume number column 41F, while a product number of the storage device 5 including the copy destination volume VOL is stored in the copy destination storage product number 41E.

The copy source volume hash value list region 42 is a region where a list of hash values of chunk data strings stored in respective chunks of the copy source volume VOL (hereinafter this list will be referred to as a copy source volume hash value list) 42X is stored, and becomes activated only when the copy mode is a volume copy. The copy source volume hash value list 42X herein includes a logical address column 42XA, a size column 42XB, a hash value column 42XC, and a copy-completion flag column 42XD each provided for each of chunks of the copy source volume VOL in association with each other.

In addition, a logical address of a corresponding chunk is stored in the logical address column 42XA, while a size of a chunk data string stored in a corresponding chunk is stored in the size column 42XB. Moreover, a hash value calculated for a chunk data string stored in a corresponding chunk is stored in the hash value column 42XC. A flag indicating whether or not copying of a chunk data string stored in a corresponding chunk has been completed (this flag will be hereinafter referred to as a copy-completion flag) is stored in the copy-completion flag column 42XD. The copy-completion flag is set to "uncompleted" in a case where copying of the corresponding chunk data string is not completed yet, and is set to "completed" in a case where this copying is completed. All the copy-completion flags are set to "uncompleted" in an initial stage.

On the other hand, the copy target file list region 43 is a region where a list of files and/or objects corresponding to copy targets (this list will be hereinafter referred to as a copy target file list) 43X is stored, and becomes activated only when the copy mode is a file copy. The copy target file list 43X herein includes a file name column 43XA, a size column 43XB, a hash value column 43XC, and a copy-completion flag column 43XD each provided for each of files and/or objects as copy targets in association with each other.

Furthermore, a name of a corresponding file or object is stored in the file name column 43XA, while a size of the corresponding file or object is stored in the size column 43XB. In addition, a hash value calculated for the corresponding file or object is stored in the hash value column 43XC. A copy-completion flag indicating whether or not copying of the corresponding file or object has been completed is stored in the copy-completion flag column 43XD. This copy-completion flag is also set to "uncompleted" in a case where copying of a corresponding file of object is not completed yet, and is set to "completed" in a case where the copying has been completed. All the copy-completion flags are set to "uncompleted" in an initial stage.

(4) Various Processes Associated with Copy Control Function of Present Embodiment Described next will be specific processing contents of various processes executed in association with the above-described copy control process executed by the operation management device 3.

(4-1) Integrated Hash Management Information or Others Collection Process

FIG. 17 presents a flow of a series of processes performed by the operation management device 3 for collecting hash management information and file hash management information from the respective storage devices 5 corresponding to management targets within the information processing system 1 (hereinafter these processes will be referred to as an integrated hash management information or others collection process). The operation management device 3 collects integrated hash information and integrated file hashes associated with the storage devices 5 by performing procedures presented in this figure of FIG. 17 in cooperation with the management agents 8 and 20 (FIGS. 2 and 3) of the respective storage devices 5 corresponding to management targets.

This integrated hash management information or others collection process is regularly executed. Specifically, the management information transmission/reception and storage unit 12 of the operation management device 3 initially selects one of the storage devices 5 corresponding to monitoring targets and registered in the storage management information database 16 (S20).

Subsequently, the management information transmission/reception and storage unit 12 specifies a storage type of the selected storage device selected in step S20 (this storage device will be hereinafter referred to as a selected storage device) with reference to the storage management information database 16 (S21).

Moreover, the management information transmission/reception and storage unit 12 determines whether or not the storage type specified in step S21 is a block storage ("SDS block" or "block") (S22), and requests the management agent 8 of the selected storage device 5 to transmit hash management information when obtaining an affirmative result (S23).

The management agent 8 of the selected storage device 5 having received this request collects hash values of chunk data strings stored in respective chunks within the volume VOL corresponding to the copy target in the selected storage device 5 from the hash management information table 11 (FIGS. 2 and 13), and calculates bucket values of the entire volume VOL corresponding to the copy target on the basis of these collected hash values (S24). Moreover, the management agent 8 transmits the calculated bucket values of the volume VOL to the management information transmission/reception and storage unit 12 of the operation management device 3 as hash management information (S25).

Thereafter, the management information transmission/reception and storage unit 12 of the selected storage device 5 having received this hash management information updates bucket values of the volume VOL corresponding to the copy target stored in the integrated hash management information database 18 (FIG. 7B) until that time to bucket values contained in the received hash management information (overwrites the bucket values contained in the hash management information on the bucket values of the volume VOL corresponding to the copy target stored in the integrated hash management information database 18 until that time) (S26). The flow then proceeds to step S31.

On the other hand, when a negative result is obtained in the determination in step S22, the management information transmission/reception and storage unit 12 of the operation management device 3 requests the management agent 20 of the selected storage device 5 to transmit file hash management information (S27).

The management agent 20 of the selected storage device 5 having received this request collects hash values of respective files and/or objects corresponding to copy target and stored in the selected storage device 5 from the file hash management information table 22 (FIGS. 3 and 15), and calculates bucket values of the entire selected storage device 5 on the basis of these collected hash values (S28). Moreover, the management agent 20 transmits the calculated bucket values of the selected storage device 5 to the management information transmission/reception and storage unit 12 of the operation management device 3 as file hash management information (S29).

The management information transmission/reception and storage unit 12 of the operation management device 3 having received this hash management information updates bucket values associated with the selected storage device 5 and stored in the integrated file hash management information database 23 until that time to bucket values contained in the received hash management information (overwrites the bucket values contained in the hash management information on the bucket values associated with the selected storage device 5 and stored in the integrated file hash management information database 23 until that time) (S30).

Thereafter, the management information transmission/reception and storage unit 12 determines whether or not the storage device 5 not yet subjected to the processing in step S21 and following steps is present in the storage devices 5 corresponding to the monitoring targets (S31). When an affirmative result is obtained in this determination, the management information transmission/reception and storage unit 12 subsequently returns to step S20, and then repeatedly executes the processing in step S21 and following steps in cooperation with the management agents 8 or 20 of the respective storage devices 5 while sequentially switching the storage device 5 selected in step S20 to the different storage devices 5 not yet subjected to the processing in step S21 and following steps.

This repeated process sequentially updates bucket values of the respective block storage devices registered in the integrated hash management information database 18 of the operation management device 3, and bucket values of the respective file/object storage devices registered in the integrated file hash management information database 23 to latest values.

Thereafter, when a negative result is eventually obtained in step S31 by completing execution of the processing in steps S21 to S30 for all the storage devices 5 corresponding to management targets, the management information transmission/reception and storage unit 12 of the operation management device 3 ends this integrated hash management information or others collection process.

(4-2) Data Copy Process
(4-2-1) Flow of Data Copy Process

Figure 18:
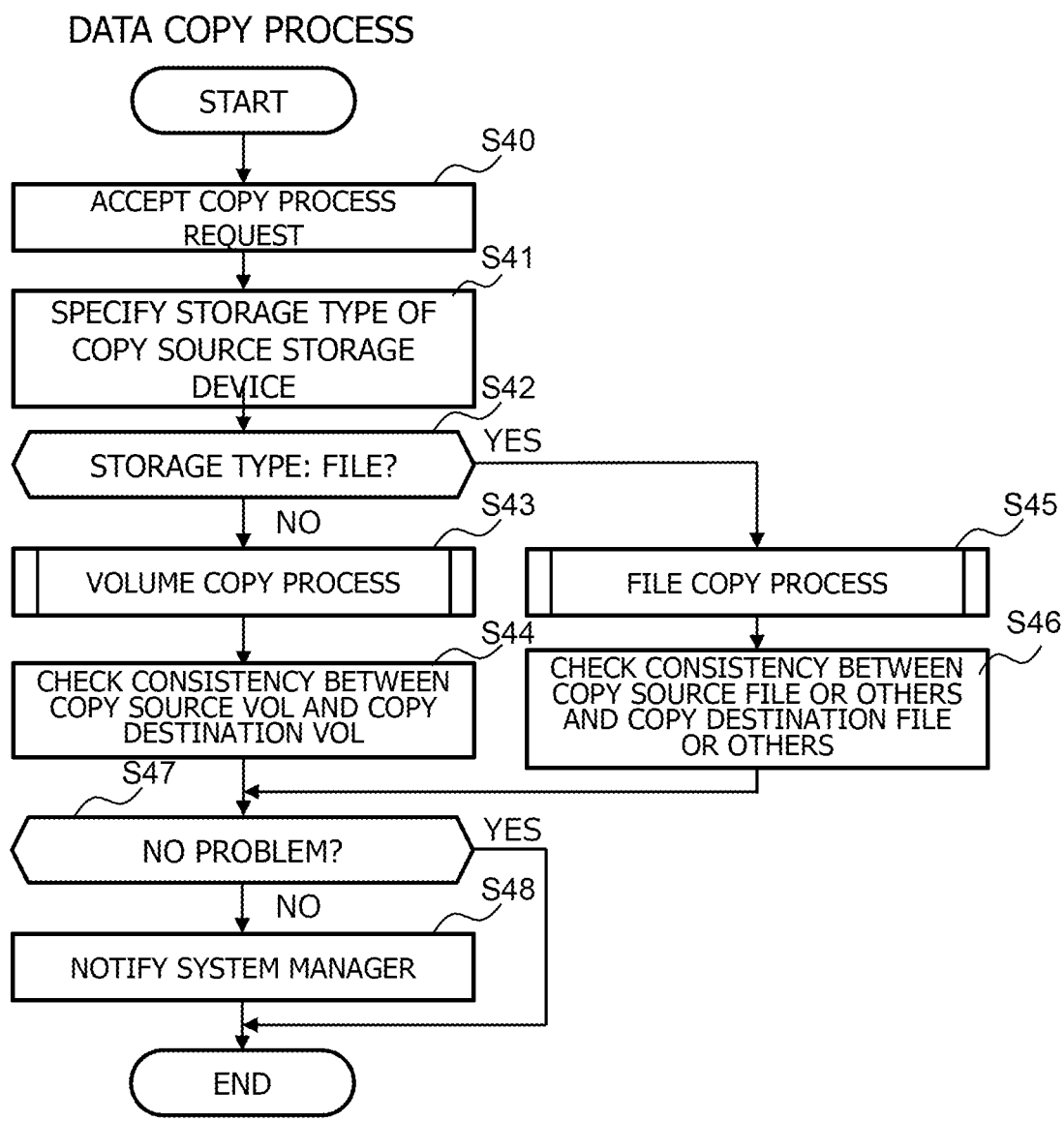
FIG. 18 is a flowchart presenting a processing procedure of a data copy process.

Meanwhile, FIG. 18 presents process contents of a series of processes executed within the operation management device 3 in a case where the copy process request 40 described above with reference to FIG. 16 is transmitted from the storage device 5 corresponding to a copy source of the volume VOL or a file (these processes will be hereinafter referred to as a data copy process). It is assumed herein that the copy process request 40 (FIG. 16) described above has contents for requesting a copy of volume data, file data, and/or object data to the storage device 5 included in a different one of the cloud systems 2.

When the operation management device 3 receives the copy process request 40 described above, the operation management device 3 starts the data copy process presented in FIG. 18. The copy process acceptance unit 13 (FIGS. 2 and 3) initially accepts this copy process request (S40).

Moreover, the copy process acceptance unit 13 acquires a product number of the copy source storage device 5 from the copy source storage product number column 41C in the basic information region 41 (FIG. 16) of the accepted copy process request 40, and specifies a storage type of the copy source storage device 5 with reference to the storage management information database 16 (FIG. 6) on the basis of the acquired product number (S41).

Subsequently, the copy process acceptance unit 13 determines whether or not the storage type of the copy source storage device 5 specified in step S41 is a file, i.e., the storage type of the copy source storage device 5 specified in step S41 is a "file" or an "SDS file" (S42).

In a case where a negative result is obtained in this determination, the copy process acceptance unit 13 transfers the copy process request 40 accepted in step S40 to the data duplication comparison unit 14 together with information indicating this fact. As a result, the data duplication comparison unit 14 and the copy system creation and instruction unit 15 execute a series of processes for copying data from the copy source volume VOL to the copy destination volume VOL (these processes will be hereinafter referred to as a volume copy process) in response to the copy process request 40 thus transferred (S43).

Thereafter, the copy system creation and instruction unit 15 executes a consistency check for checking consistency between data stored in the copy destination volume VOL and data stored in the copy source volume VOL (S44). After completion of the consistency check, the copy system creation and instruction unit 15 proceeds to step S47.

Meanwhile, in a case where an affirmative result is obtained in the determination in step S42, the copy process acceptance unit 13 transfers the copy process request 40 accepted in step S40 to the data duplication comparison unit 14 together with information indicating this fact. As a result, the data duplication comparison unit 14 and the copy system creation and instruction unit 15 execute a series of processes for copying files and/or objects corresponding to the copy target and stored in the copy source storage device 5 to the copy destination storage device 5 (these processes will be hereinafter referred to as a file copy process) in response to the copy process request 40 thus transferred (S45).

Thereafter, the copy system creation and instruction unit 15 executes a consistency check for checking consistency between data of respective files and/or respective objects copied to the copy destination storage device 5 and data of respective files and/or respective objects corresponding to the copy target and stored in the copy source storage device 5 (S46).

Subsequently, the copy system creation and instruction unit 15 determines whether or not any problem has been detected during the consistency check in step S44 or step S46 (S47), and ends the process when an affirmative result is obtained in this determination. In this manner, the series of the data copy process presented in FIG. 18 end.

On the other hand, when a negative result is obtained in the determination in step S47, the copy system creation and instruction unit 15 notifies the system manager 7 (FIG. 1) of detection of the problem in the consistency check (S48), and then ends the process. In this manner, the series of the data copy process presented in FIG. 18 end.

Figure 19:
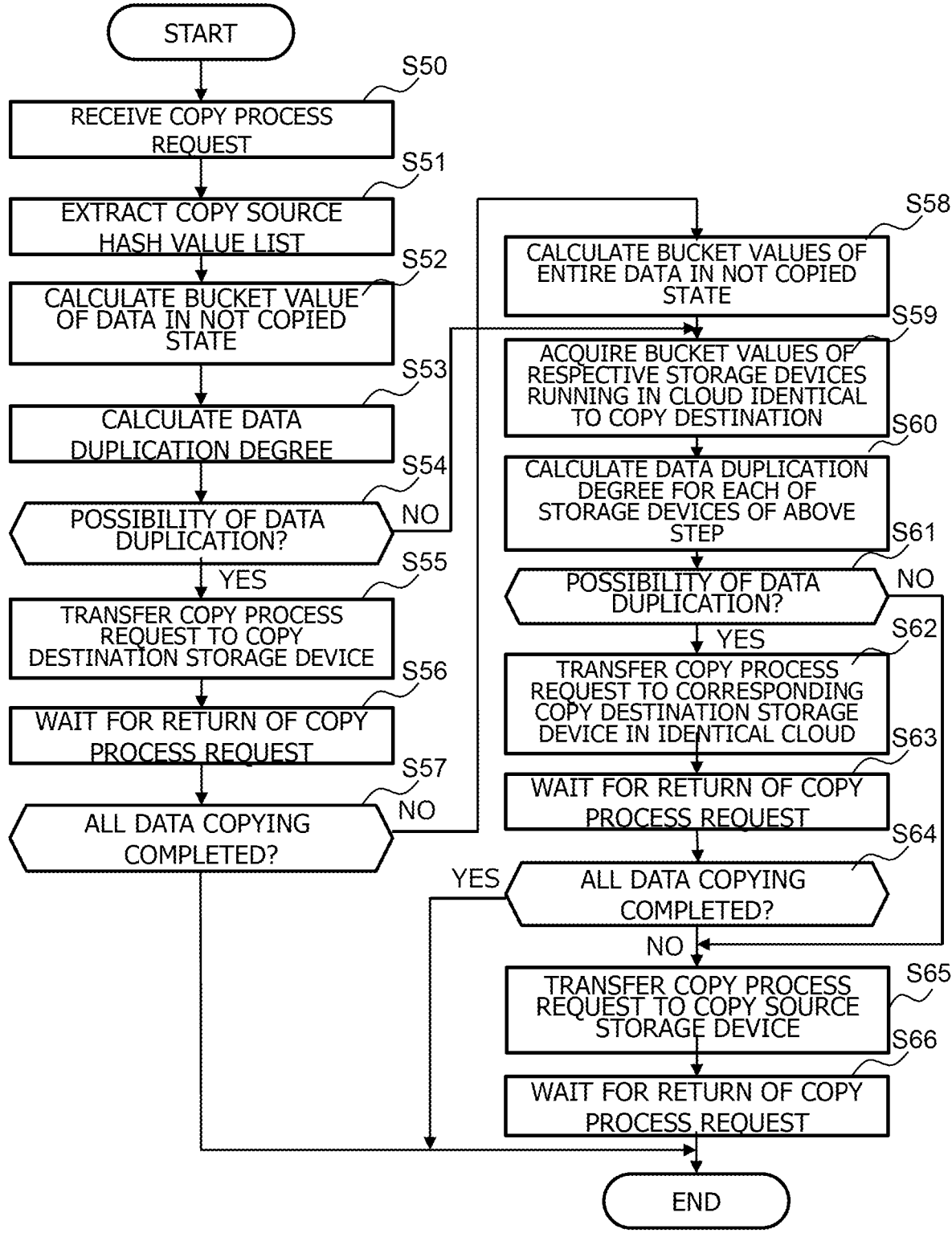
FIG. 19 is a flowchart presenting a processing procedure of a volume copy process.

(4-2-2) Volume Copy Process (4-2-2-1) Specific Process Contents of Volume Copy Process FIG. 19 presents specific process contents of the volume copy process executed by the data duplication comparison unit 14 and the copy system creation and instruction unit 15 in step S43 of the data copy process described above with reference to FIG. 18.

This volume copy process is started in a case where a negative result is obtained in step S42 of the data copy process. The data duplication comparison unit 14 initially receives the copy process request 40 (FIG. 16) transferred from the copy process acceptance unit 13 (S50).

Thereafter, the data duplication comparison unit 14 extracts the copy source volume hash value list 42X (FIG. 16) from the received copy process request 40 (S51), and calculates, on the basis of the extracted copy source volume hash value list 42X, bucket values of data in an uncompleted copy state stored in the copy source volume VOL using a predetermined algorithm, such as HyperLogLog, with reference to information associated with respective entries each having a copy-completion flag set to "uncompleted" (S52).

Subsequently, the data duplication comparison unit 14 reads bucket values of the copy destination volume VOL from the integrated hash management information database 18 (FIG. 7B), and calculates a data duplication degree between the read bucket values and the bucket values calculated in step S52 using a predetermined algorithm such as HyperLogLog (S53).

The data duplication comparison unit 14 then determines whether or not there is a possibility of duplication between the data stored in the copy source volume VOL and the data stored in the copy destination storage device 5 on the basis of the data duplication degree calculated in step S53 (S54).

Specifically, the data duplication comparison unit 14 determines whether or this duplication degree has a threshold set beforehand (this threshold will be hereinafter referred to as a data duplication degree threshold) or larger. This determination is made because there is determined to be no data duplication, or only a small degree of duplication, if any, between the data stored in the copy source volume VOL and the data stored in the copy destination storage device 5 in a case where the data duplication degree calculated in step S53 is smaller than the foregoing data duplication degree threshold. When a negative result is thus obtained in the determination in step S54, the data duplication comparison unit 14 then proceeds to step S59.

On the other hand, when it is determined that the data duplication degree calculated in step S53 is the data duplication degree threshold or larger, it may be determined that there is data duplication between the data stored in the copy source volume VOL and the data stored in the copy destination storage device 5 (data thus duplicated will be hereinafter referred to as duplicated data). When an affirmative result is obtained in step S54, the data duplication comparison unit 14 then notifies the copy system creation and instruction unit 15 of this determination result, and gives the copy process request 40 received in step S50 to the copy system creation and instruction unit 15. Moreover, the copy system creation and instruction unit 15 transfers the given copy process request 40 to the copy destination storage device 5 (S55).

As a result, the copy destination storage device 5 given the copy process request 40 described above from the copy system creation and instruction unit 15 executes a copy process in a manner described below for copying the duplicated data described above from the volume VOL other than the copy destination volume VOL to a corresponding logical address (a logical address where this duplicated data has been stored in the copy source volume VOL) within the copy destination volume VOL. Note that this copy process is a copy process performed within the same cloud system 2. Accordingly, this copy process will be hereinafter referred to as an in-cloud data copy process. Thereafter, the copy destination storage device 5 returns, to the copy system creation and instruction unit 15, the copy process request 40 which has the copy-completion flag changed to "completed" in the entry corresponding to the above copy-completed duplicated data in the entries of the copy source volume hash value list 42X included in the copy process request 40 described above.

At this time, the copy system creation and instruction unit 15 waits for the return of the copy process request 40 described above from the copy destination storage device 5 (S56). When the copy process request 40 described above is returned, the copy system creation and instruction unit 15 determines whether or not all data within the copy source volume VOL has been copied to the copy destination volume VOL (S57). This determination is made by determining whether or not the respective copy-completion flags stored in the copy-completion flag column 42XD (FIG. 16) of the respective entries of the copy source volume hash value list 42X included in the returned copy process request 40 are all "completed."

An affirmative result obtained in this determination indicates that all data stored in the copy source volume VOL is originally present within the copy destination storage device 5, and that all of these data (duplicated data) has been copied to the corresponding logical addresses within the copy destination volume VOL. The copy system creation and instruction unit 15 thus ends the process at this time. In this case, the volume copy process herein ends accordingly.

On the other hand, a negative result obtained in the determination in step S57 indicates that all data stored in the copy source volume VOL is not present within the copy destination storage device 5, and that data uncopied from the copy source volume VOL to the copy destination volume VOL is present. Accordingly, the copy system creation and instruction unit 15 at this time calculates bucket values using a predetermined algorithm, such as HyperLogLog, on the basis of all hash values stored in the hash value columns 42XC (FIG. 16) of the respective entries each having the copy-completion flag set to "uncompleted" in the copy source volume hash value list 42X of the copy process request 40 returned from the copy destination storage device 5 (S58).

Subsequently, the copy system creation and instruction unit 15 specifies all the storage devices 5 (block storage devices) running in the same cloud system 2 as the cloud system 2 of the copy destination storage device 5 and other than the copy destination storage device 5 owned or used by the same organization as the organization of the copy source storage device 5 with reference to the storage management information database 16 (FIGS. 2 and 6), and extracts backet values of the respective specified storage devices 5 from the integrated hash management information database 18 (FIGS. 2 and 7B) (S59).

Thereafter, the copy system creation and instruction unit 15 calculates a data duplication degree between the data within the respective storage devices 5 and the data not yet copied to the copy destination volume VOL using a predetermined algorithm, such as HyperLogLog, for each of the block storage devices (storage devices 5) running in the same cloud system 2 as the cloud system 2 of the copy destination storage device 5 and other than the copy destination storage device 5 owned or used by the same organization as the organization of the copy source storage device 5 on the basis of the bucket values calculated in step S58 and the respective bucket values extracted in step S59 (S60).

The data duplication comparison unit 14 then determines whether or not there is a possibility of data duplication between the data within any of the storage devices 5 (block storage devices) running in the same cloud system 2 as the cloud system 2 of the copy destination storage device 5 and other than the copy destination storage device 5 owned or used by the same organization as the organization of the copy source storage device 5, and the data not yet copied to the copy destination volume VOL on the basis of the data duplication degree calculated in step S60 (S61).

Specifically, the data duplication comparison unit 14 determines whether or not this data duplication degree is the data duplication degree threshold described above or larger. This determination is made because no data duplication, or only slight data duplication, if any, may be determined to be present between the data within the respective storage devices 5 (block storage devices) running in the same cloud system 2 as the cloud system 2 of the copy destination storage device 5 and other than the copy destination storage device 5 owned or used by the same organization as that of the copy source storage device 5, and the data not yet copied to the copy destination volume VOL in a case where the data duplication degree calculated in step S60 is smaller than the data duplication degree threshold. When a negative result is obtained in the determination in step S61, the data duplication comparison unit 14 then proceeds to step S65.

On the other hand, when the storage device 5 having the data duplication threshold or larger as the data duplication degree calculated in step S60 is present, it may be determined that there is data duplication between the data within the corresponding storage device 5 and the data not yet copied to the copy destination volume VOL (duplicated data is present).

When an affirmative result is obtained in the determination in step S61, the data duplication comparison unit 14 then notifies the copy system creation and instruction unit 15 of this determination result, and gives the copy process request 40 returned from the copy destination storage device 5 in step S56 to the copy system creation and instruction unit 15. Moreover, the copy system creation and instruction unit 15 transfers the given copy process request 40 to all the storage devices 5 determined to have data duplication in step S61 (S62).

As a result, each of the storage devices 5 given the copy process request 40 described above from the copy system creation and instruction unit 15 executes a copy process for copying the duplicated data described above to a corresponding logical address (logical address where this duplication data has been stored in the copy source volume VOL) within the copy destination volume VOL in a manner described below. Note that contents of this copy process are the same as those of the above-mentioned data copy process performed within the same cloud. Thereafter, the copy destination storage device 5 returns, to the copy system creation and instruction unit 15, the copy process request 40 having the copy-completion flag changed to "completed" in the entry corresponding to the above copy-completed duplicated data in the entries of the copy source volume hash value list 42X included in the copy process request 40 described above.

At this time, the copy system creation and instruction unit 15 waits for the return of the copy process request 40 described above from the respective corresponding storage devices 5 (S63). When the copy process request 40 described above is returned from all the storage devices 5, the copy system creation and instruction unit 15 determines whether or not copying of all data within the copy source volume VOL has been copied to the copy destination volume VOL (S64). This determination is made by merging the copy source volume hash value lists 42X of the respective returned copy process requests 40, and determining whether or not the respective copy-completion flags stored in the copy-completion flag columns 42XD of the respective entries of the merged copy source volume hash value lists 42X are all "completed."

An affirmative result obtained in this determination indicates that copying of all data stored in the copy source volume VOL to the copy destination volume VOL has been completed. The copy system creation and instruction unit 15 thus ends the process at this time. Moreover, the volume copy process herein ends accordingly.

On the other hand, a negative result obtained in the determination in step S64 indicates that copying of all data stored in the copy source volume VOL to the copy destination volume VOL is not yet completed. At this time, the copy system creation and instruction unit 15 thus transfers the copy process request 40 having the merged copy source volume hash value lists 42X created as described above to the copy source storage device 5 (S65).

As a result, the copy source storage device 5 given the copy process request 40 described above from the copy system creation and instruction unit 15 executes a copy process for copying, to the copy destination volume VOL, the data not yet copied to the copy destination volume VOL in the data stored in the copy source volume VOL. Note that this copy process is data copying between the cloud system 2 having the copy source storage device 5, and the cloud system 2 having the copy destination storage device 5. Accordingly, this copy process will be hereinafter referred to as a cloud-to-cloud data copy process. Thereafter, the copy source storage device 5 returns, to the copy system creation and instruction unit 15, the copy process request 40 which has the copy-completion flag changed to "completed" in the entry corresponding to the copy-completed data in the entries of the copy source volume hash value list 42X included in the copy process request 40 described above.

At this time, the copy system creation and instruction unit 15 waits for the return of the above copy process request 40 from the copy source storage device 5 (S63). When receiving the above copy process request 40 from the corresponding storage device 5, the copy system creation and instruction unit 15 ends the process. Accordingly, this volume copy process herein also ends.

(4-2-2-2) In-Cloud Data Copy Process

Figure 20:
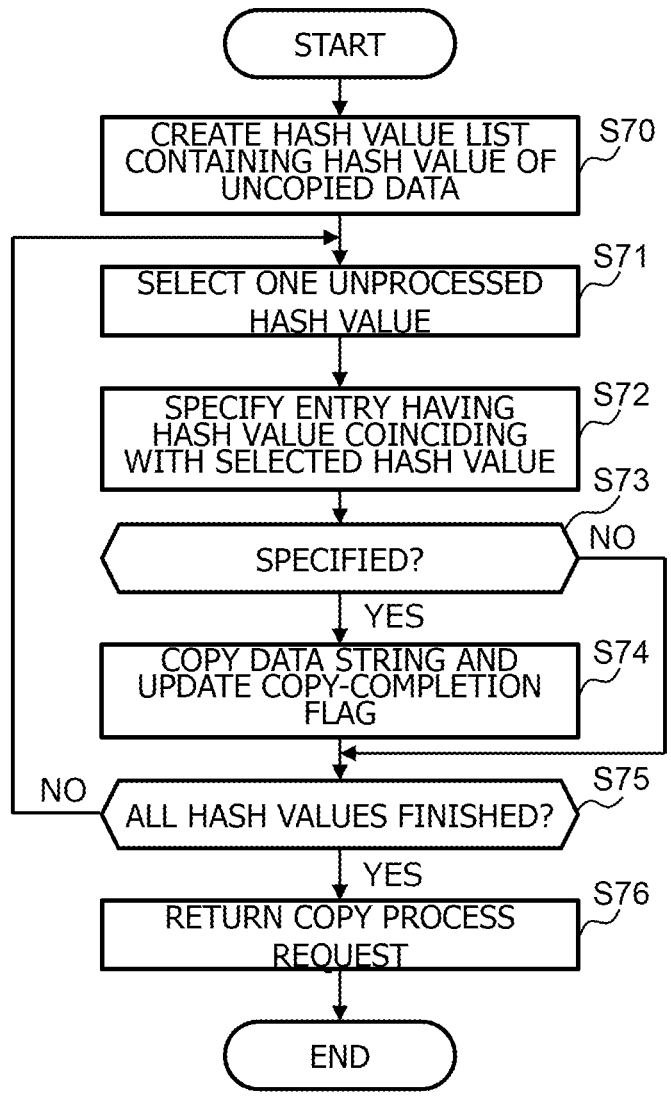
FIG. 20 is a flowchart presenting a processing procedure of an in-cloud data copy process.

FIG. 20 presents specific process contents of the in-cloud data copy process executed by the management agent 8 of the storage device 5 having received the copy process request 40 transferred from the copy system creation and instruction unit 15 of the operation management device 3 in step S55 or step S62 of the volume copy process.

When the own storage device 5 receives the copy process request 40 described above, the management agent 8 starts this in-cloud data copy process presented in FIG. 20 to initially extract the copy source volume hash value list 42X (FIG. 16) from the received copy process request, and creates a not-depicted hash value list containing hash values of all entries each having a copy-completion flag set to "uncompleted" on the basis of the extracted copy source volume hash value list 42X (S70).

Subsequently, the management agent 8 selects one hash value for which processing in step S72 and following steps is not yet performed from the hash values contained in the hash value list created in step S70 (S71). Moreover, the management agent 8 specifies an entry which has a hash value stored in the hash value column 11A (FIG. 13) and coinciding with the hash value selected in step S71 (this hash value will be hereinafter referred to as a selected hash value in the description with reference to FIG. 20) from respective entries of the hash management information table 11 (FIGS. 2 and 13) managed by the management agent 8 (S72).

Thereafter, the management agent 8 determines whether or not a corresponding entry has been specified in step S72, and whether or not a chunk data string corresponding to the selected hash value has been therefore specified (S73). When a negative result is obtained in the determination in step S73, the management agent 8 then proceeds to step S75.

On the other hand, when an affirmative result is obtained in the determination in step S73, the management agent 8 transmits the chunk data string corresponding to the selected hash value to the copy destination storage device 5 to copy the corresponding chunk data string to the copy destination volume VOL. Moreover, the management agent 8 updates the copy-completion flag stored in the copy-completion flag column 42XD (FIG. 16) of the entry corresponding to the selected hash value in the copy source volume hash value list 42X of the copy process request 40 received at that time from "uncompleted" to "completed" (S74).

Furthermore, the management agent 8 determines whether or not the processing from step S72 to step S74 has been executed for all the hash values contained in the hash value list created in step S70 (S75). Subsequently, when a negative result is obtained in this determination, the management agent 8 returns to step S71, and then repeats the processing from step S71 to step S75 while sequentially switching the hash value selected in step S71 to a different hash value for which the processing in step S72 and following steps is not yet completed.

Thereafter, when an affirmative result is eventually obtained in step S75 by completing execution of the processing from step S72 to step S74 for all the hash values contained in the hash value list created in step S70, the management agent 8 returns the copy process request 40 described above to the copy system creation and instruction unit 15 of the operation management device 3 (S76), and subsequently ends this in-cloud data copy process.

(4-2-2-3) Cloud-To-Cloud Data Copy Process

Figure 21:
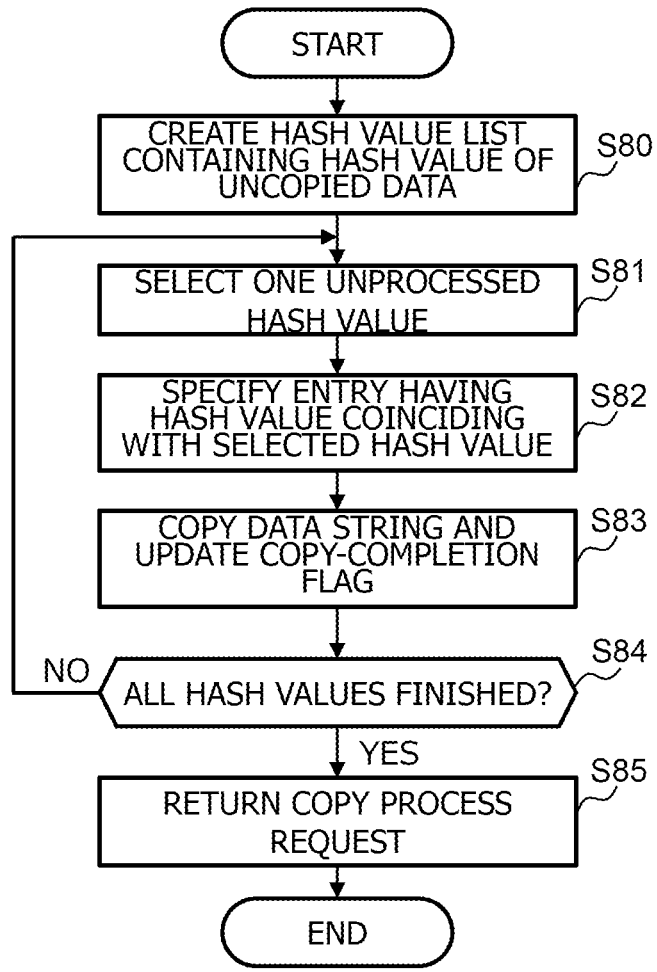
FIG. 21 is a flowchart presenting a processing procedure of a cloud-to-cloud data copy process.

FIG. 21 presents specific process contents of the cloud-to-cloud data copy process executed by the management agent 8 of the copy source storage device 5 having received the copy process request 40 transmitted from the operation management device 3 in step S65 of the volume copy process described above with reference to FIG. 19.

When the own storage device (copy source storage device) 5 receives the copy process request 40 described above, the management agent 8 starts this cloud-to-cloud data copy process depicted in FIG. 21 to initially extract the copy source volume hash value list 42X (FIG. 16) from the received copy process request 40, and creates a not-depicted hash value list containing hash values of all entries each having a copy-completion flag set to "uncompleted" on the basis of the extracted copy source volume hash value list 42X (S80).

Subsequently, the management agent 8 selects one hash value for which processing in step S82 and following steps is not yet performed from the hash values contained in the hash value list 42X created in step S80 (S81). Moreover, the management agent 8 specifies an entry having a hash value stored in the hash value column 11A (FIG. 13) and coinciding with the hash value selected in step S81 (this hash value will be hereinafter referred to as a selected hash value in the description with reference to FIG. 21) from respective entries of the hash management information table 11 (FIGS. 2 and 13) managed by the management agent 8 (S82).

Subsequently, the management agent 8 reads the chunk data string corresponding to the entry specified in step S82 from the corresponding volume VOL and transmits the read chunk data string to the storage device 5 having the copy destination volume VOL to copy the corresponding chunk data string to the corresponding logical address within the copy destination volume VOL. Moreover, the management agent 8 updates the flag stored in the copy-completion flag column 42XD of the entry corresponding to the selected hash value in the copy source volume hash value list 42X of the copy process request 40 received at that time from "uncompleted" to "completed" (S83).

Furthermore, the management agent 8 determines whether or not the processing from step S82 to step S83 has been executed for all the hash values contained in the hash value list created in step S80 (S84). Subsequently, when a negative result is obtained in this determination, the management agent 8 returns to step S81, and then repeats the processing from step S81 to step S84 while sequentially switching the hash value selected in step S81 to a different hash value for which the processing in step S82 and following steps is not yet completed.

Thereafter, when an affirmative result is eventually obtained in step S84 by completing execution of the processing from step S82 to step S83 for all the hash values contained in the hash value list created in step S80, the management agent 8 returns the copy process request 40 described above to the copy system creation and instruction unit 15 of the operation management device 3 (S85), and subsequently ends this cloud-to-cloud data copy process.

Figure 22:
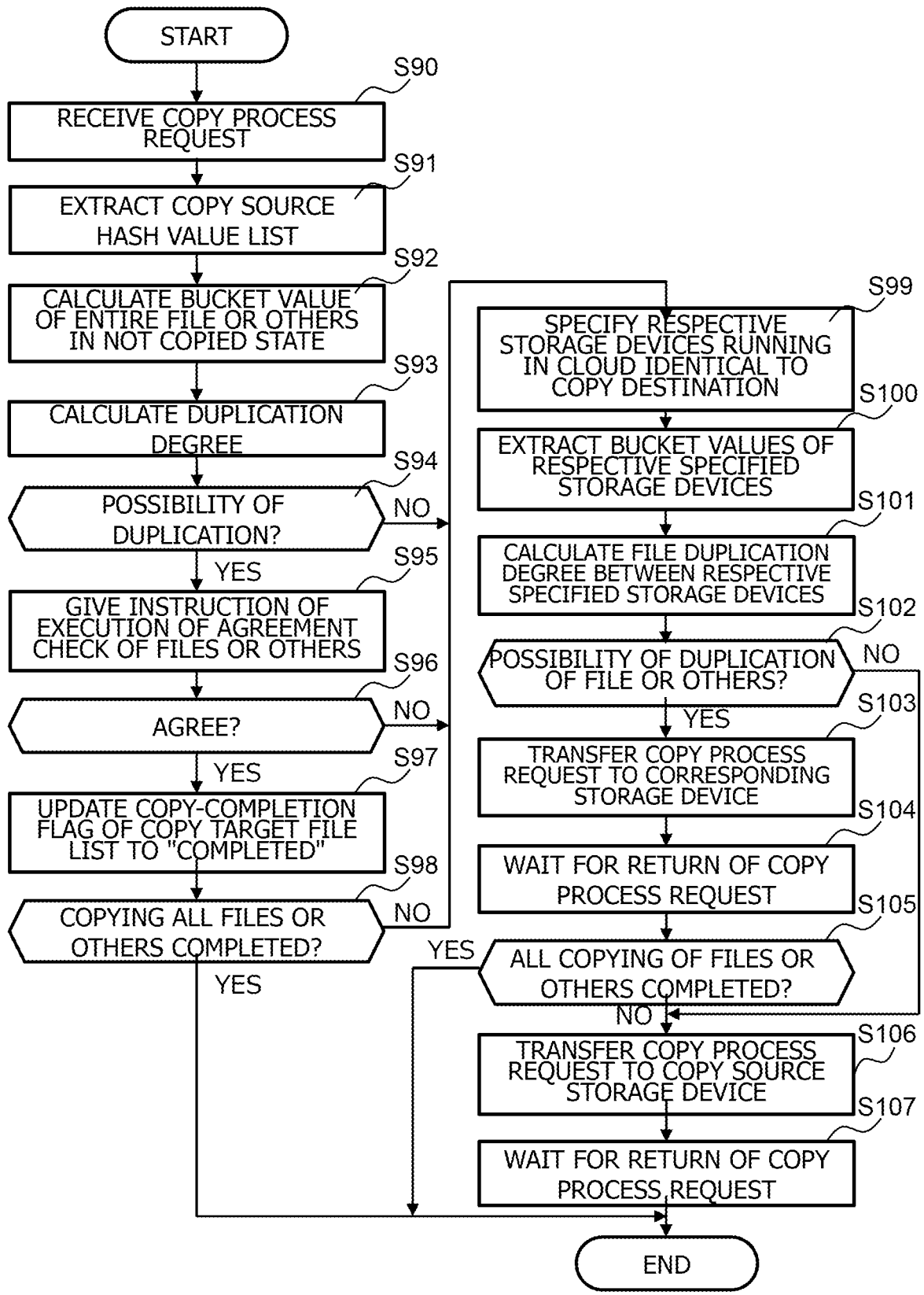
FIG. 22 is a flowchart presenting a processing procedure of a file copy process.

(4-2-3) File Copy Process (4-2-3-1) Specific Process Contents of File Copy Process Meanwhile, FIG. 22 presents specific process contents of the file copy process executed by the data duplication comparison unit 14 and the copy system creation and instruction unit 15 in step S45 of the data copy process described above with reference to FIG. 18.

This volume copy process is started in a case where an affirmative result is obtained in step S42 of the data copy process. The data duplication comparison unit 14 initially receives the copy process request 40 (FIG. 16) transferred from the copy process acceptance unit 13 (S90).

Thereafter, the data duplication comparison unit 14 extracts the copy target file list 43X (FIG. 16) from the received copy process request 40 (S91), and calculates bucket values of entire copy target files and/or objects (hereinafter files and objects will be collectively referred to as files and others) using a predetermined algorithm, such as HyperLogLog, on the basis of information associated with respective entries each having a copy-completion flag set to "uncompleted" obtained from the extracted copy target file list 43X (S92).

Subsequently, the data duplication comparison unit 14 reads bucket values of the copy destination storage device 5 from the integrated file hash management information database 23 (FIGS. 3 and 18B), and calculates a file/others duplication degree with the copy target file or others on the basis of the read bucket values and the bucket values calculated in step S92 using a predetermined algorithm such as HyperLogLog (S93).

The data duplication comparison unit 14 then determines whether or not there is a possibility of duplication between the copy target files or others and a part of respective files or others stored in the copy destination storage device 5 (a possibility that the copy target files or others are already stored in the copy destination storage device 5) on the basis of the file/others duplication degree calculated in step S93 (S94).

Specifically, the data duplication comparison unit 14 determines whether or not this file/others duplication degree is smaller than a threshold set beforehand (this threshold will be hereinafter referred to as a file/others duplication degree threshold). This determination is made because it may be determined that no data duplication, or only a small degree of duplication, if any, is present between the copy target files or others stored in the copy source storage device 5 and the files or others stored in the copy destination storage device 5 in a case where the duplication degree calculated in step S93 is smaller than the foregoing file/others duplication threshold. When a negative result is obtained in the determination in step S94, the data duplication comparison unit 14 then proceeds to step S99.

On the other hand, in a case where the file/others duplication degree calculated in step S93 is the file/others duplication degree threshold or larger, it may be determined that duplication of files or others is present between the copy target files or others and the files or others stored in the copy destination storage device 5. When an affirmative result is obtained in the determination in step S94, the copy system creation and instruction unit acquires hash values of the respective copy target files or others from the copy source storage device 5 via the management information transmission/reception and storage unit 12, and transmits the acquired hash values to the copy destination storage device 5 together with an agreement check instruction (S95).

Subsequently, the management agent 20 (FIG. 3) of the copy destination storage device 5 having received this agreement check instruction compares the hash values of the respective copy target files or others given together with this agreement check instruction, with hash values of the respective files or others present within the own storage device 5 and stored in the file hash management information table 22 (FIGS. 3 and 15) managed by the management agent 20. Thereafter, in a case where no file or others having an agreeing hash value is present, the management agent 20 in this case transmits a reply indicating this fact to the copy system creation and instruction unit 15 of the operation management device 3. In a case where any file or others having an agreeing hash value is present, the management agent 20 transmits a reply containing identification information such as a file name for identifying this file or others to the copy system creation and instruction unit 15 of the operation management device 3.

The copy system creation and instruction unit 15 at this time waits for the reply from the copy destination storage device 5. At the time of reception of this reply, the copy system creation and instruction unit 15 determines whether or not at least one file or others exhibiting agreement has been already stored in the copy destination storage device 5 on the basis of contents of this reply (S96).

Thereafter, when a negative result is obtained in this determination, the copy system creation and instruction unit 15 proceeds to step S99. On the other hand, in a case where an affirmative result is obtained, the copy system generation and instruction unit 15 updates the copy-completion flag to "completed," which flag has been stored in the copy-completion flag column 43XD (FIG. 16) for each entry corresponding to the copy target file or others whose identification information is contained in this reply (i.e., the copy target files or others already stored in the copy destination storage device 5) in the copy target file list 43X of the copy process request 40 received in step S90 (S97).

Subsequently, the copy system creation and instruction unit 15 determines whether or not all the copy target files or others have been copied to the copy destination storage device 5 (S98). This determination is made by determining whether or not the respective copy-completion flags stored in the copy-completion flag columns 43XD (FIG. 16) for respective entries of the copy target file list 43X included in the copy process request 40 updated in step S98 are all "completed."

An affirmative result obtained in this determination indicates that all the copy target files or others are originally present in the copy destination storage device 5. The copy system creation and instruction unit 15 thus ends the process at this time. Moreover, in this case, the volume copy process herein ends accordingly.

On the other hand, a negative result obtained in the determination in step S98 indicates that all the copy target files or others are not present in the copy destination storage device 5, and that files or others not yet copied from the copy source storage device 5 to the copy destination storage device 5 are present.

Subsequently, the copy system creation and instruction unit 15 at this time specifies all the storage devices 5 (file/object storage devices) running in the same cloud system 2 as the cloud system 2 of the copy destination storage device 5 and other than the copy destination storage device 5 owned or used by the same organization as the organization of the copy source storage device 5 with reference to the storage management information database 16 (FIGS. 3 and 6) (S99), and extracts backet values of the respective specified storage devices 5 from the integrated hash management information database 18 (FIGS. 2 and 8B) (S100).

Thereafter, the copy system creation and instruction unit 15 calculates each file/others duplication degree between the files or others stored in the storage device 5 and the copy target files or others using a predetermined algorithm, such as HyperLogLog, for each of the storage devices 5 (file/object storage devices) running in the same cloud system 2 as the cloud system 2 of the copy destination storage device 5 and other than the copy destination storage device 5 owned or used by the same organization as the organization of the copy source storage device 5 on the basis of the bucket values calculated in step S92 and the bucket values of the respective storage devices 5 extracted in step S100 (S101).

The data duplication comparison unit 14 then determines whether or not there is a possibility of duplication between the files or others stored in any of the storage devices 5 (file/object storage devices) running in the same cloud system 2 as the cloud system 2 of the copy destination storage device 5 and other than the copy destination storage device 5 owned or used by the same organization as the organization of the copy source storage device 5, and the copy target files or others on the basis of the file/others duplication degrees calculated in step S101 (S102).

Specifically, the data duplication comparison unit 14 determines whether or not each of these file/others duplication degree is the file/others duplication degree threshold described above or larger. This determination is made because it may be determined that no duplication, or only slight duplication, if any, is present between the files or others stored in any of the storage devices 5 (file/object storage devices) running in the same cloud system 2 as the cloud system of the copy destination storage device 5 and other than the copy destination storage device 5 owned or used by the same organization as the organization of the copy source storage device 5, and the copy target files or others in a case where the file/others duplication degree calculated in step S101 is smaller than the file duplication degree threshold. When a negative result is obtained in the determination in step S102, the data duplication comparison unit 14 then proceeds to step S106.

On the other hand, if the storage device 5 exhibiting the file/others duplication degree threshold or larger is present in step S101, it may be determined that duplication of files or others is present between the files or others stored in the corresponding storage device 5 and the copy target files or others (duplicate files or others are present).

Thereafter, when an affirmative result is obtained in the determination in step S102, the data duplication comparison unit 14 notifies the copy system creation and instruction unit 15 of this determination result, and gives the copy process request 40 received in step S90 or including the copy target file list 43X updated in step S97 to the copy system creation and instruction unit 15. Moreover, the copy system creation and instruction unit 15 transfers the given copy process request 40 to all the storage devices 5 determined as storage devices which may have file/others duplication in step S102 (S103).

Accordingly, each of the storage devices 5 to which the copy process request 40 described above has been given from the copy system creation and instruction unit 15 executes a copy process for copying the duplicate files or others to the copy destination storage device 5 in a manner described below. Thereafter, the copy destination storage device 5 returns, to the copy system creation and instruction unit 15, the copy process request 40 having the copy-completion flag changed to "completed" in the entry corresponding to the above copy-completed duplicate files or others in the entries of the copy target file list 43X included in the copy process request 40 described above.

At this time, the copy system creation and instruction unit 15 waits for the return of the copy process request 40 described above from the corresponding storage devices 5 (S104). When the copy process request 40 described above is returned from all the storage devices 5, the copy system creation and instruction unit 15 determines whether or not copying of all the copy target files or others to the copy destination storage device 5 has been completed (S105). This determination is made by merging the copy target file lists 43X of the respective returned copy process requests 40, and determining whether or not the respective copy-completion flags stored in the copy-completion flag columns 43XD of the respective entries of the merged copy target file lists 43X are all "completed."

An affirmative result obtained in this determination indicates that all the copy target files or others have been copied to the copy destination storage device 5. The copy system creation and instruction unit 15 thus ends the process at this time. Moreover, the file copy process herein ends accordingly.

On the other hand, a negative result obtained in the determination in step S105 indicates that all the copy target files or others are not yet copied to the copy destination storage device 5. At this time, the copy system creation and instruction unit 15 thus transfers the copy process request 40 including the merged copy target file lists 43X and created as described above to the copy source storage device 5 (S106).

As a result, the copy source storage device 5 given the copy process request 40 described above from the copy system creation and instruction unit 15 executes a copy process to copy files or others, which are included in the copy target files or others and not yet copied to the copy destination storage device 5, to the copy destination storage device 5. Note that this copy process is file copying between the cloud system 2 having the copy source storage device 5, and the cloud system 2 having the copy destination storage device 5. Accordingly, this copy process will be hereinafter referred to as a cloud-to-cloud file copy process. Thereafter, the copy destination storage device 5 returns, from the copy source storage device 5 to the copy system creation and instruction unit 15, the copy process request 40 having the copy-completion flag changed to "completed" in the entries corresponding to the copy-completed files or others in the entries of the copy target file list 43X included in the copy process request 40.

At this time, the copy system creation and instruction unit 15 waits for the return of the above copy process request 40 from the copy source storage device 5 (S107). When receiving the above copy process request 40 returned from the copy source storage device 5, the copy system creation and instruction unit 15 ends the process. Accordingly, this file copy process herein also ends.

(4-2-3-2) In-Cloud File Copy Process

Figure 23:
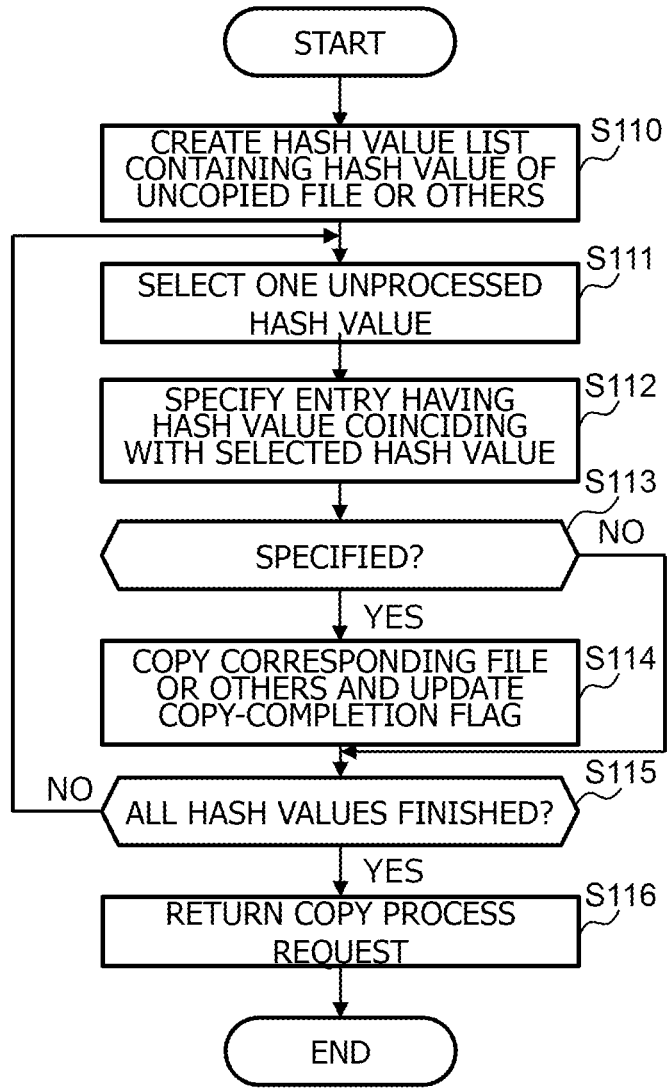
FIG. 23 is a flowchart presenting a processing procedure of an in-cloud file copy process.

FIG. 23 presents specific process contents of an in-cloud file copy process executed by the management agent 20 (FIG. 3) of the storage device 5 having received the copy process request 40 transferred from the copy system creation and instruction unit 15 of the operation management device 3 in step S103 of the file copy process.

When the own storage device 5 receives the copy process request 40 described above, the management agent 20 starts this in-cloud file copy process presented in FIG. 23 to initially extract the copy target file list 43X from the received copy process request 40, and creates a not-depicted hash value list containing hash values of all entries each having a copy-completion flag set to "uncompleted" on the basis of the extracted copy target file list 43X (S110).

Subsequently, the management agent 20 selects one hash value for which processing in step S112 and following steps is not yet performed from the hash values contained in the hash value list created in step S110 (S111). Moreover, the management agent 20 specifies an entry having a hash value stored in the file hash value column 22A (FIG. 15) and coinciding with the hash value selected in step S111 (this hash value will be hereinafter referred to as a selected hash value in the description with reference to FIG. 23) from respective entries of the hash management information table 22 managed by the management agent 20 (FIGS. 3 and 15) (S112).

Thereafter, the management agent 20 determines whether or not the corresponding entry has been specified in step S112 (S113). A negative result obtained in the determination in step S113 indicates that the file or others corresponding to the selected hash value is not stored in the storage device 5 including the corresponding management agent 20. Accordingly, the management agent 20 at this time proceeds to step S115.

On the other hand, an affirmative result obtained in the determination in step S113 indicates that the file or others corresponding to the selected hash value is stored in the storage device 5 including the corresponding management agent 20. Accordingly, the management agent 20 at this time transmits the file or others corresponding to the selected hash value to the copy destination storage device 5 to copy the file or others to the copy destination storage device 5. Moreover, the management agent 20 updates the copy-completion flag stored in the copy-completion flag column 43DX (FIG. 16) corresponding to the selected hash value in the copy target file list 43X of the copy process request 40 received at that time from "uncompleted" to "completed" (S114).

Furthermore, the management agent 20 determines whether or not the processing from step S112 to step S114 has been executed for all the hash values contained in the hash value list created in step S110 (S115). Subsequently, when a negative result is obtained in this determination, the management agent 20 returns to step S111, and then repeats the processing from step S111 to step S115 while sequentially switching the hash value selected in step S111 to a different hash value for which the processing in step S112 and following steps is not yet completed.

Thereafter, when an affirmative result is eventually obtained in step S115 by completing the processing from step S112 to step S114 for all the hash values contained in the hash value list created in step S110, the management agent 20 returns the copy process request 40 described above to the copy system creation and instruction unit 15 of the operation management device 3 (S116), and then ends this in-cloud file copy process.

(4-2-3-3) Cloud-To-Cloud File Copy Process

Figure 24:
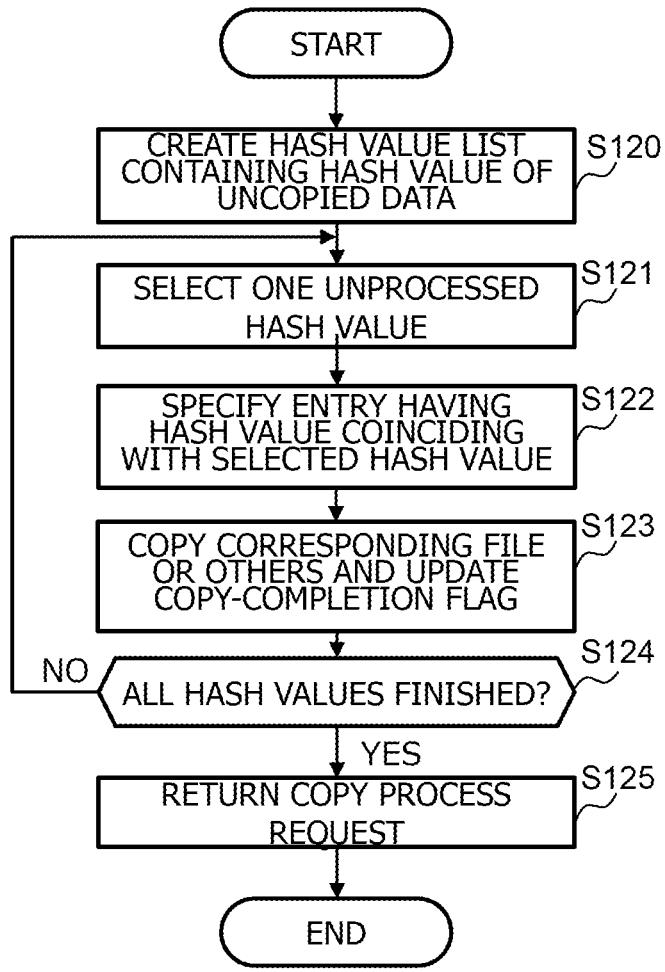
FIG. 24 is a flowchart presenting a processing procedure of a cloud-to-cloud file copy process.

FIG. 24 presents specific process contents of a cloud-to-cloud file copy process executed by the management agent 20 of the copy destination storage device 5 having received the copy process request 40 transmitted from the copy system creation and instruction unit 15 of the operation management device 3 in step S106 of the file copy process described above with reference to FIG. 22.

When the own storage device (copy destination storage device) 5 receives the copy process request 40 described above, the management agent 20 configured as above starts this cloud-to-cloud file copy process presented in FIG. 24 to initially extract the copy target file list 43X from the received copy process request 40, and creates a not-depicted hash value list containing hash values of all entries each having a copy-completion flag set to "uncompleted" on the basis of the extracted copy target file list 43X (S120).

Subsequently, the management agent 20 selects one hash value for which processing in step S122 and following steps are not yet performed from the hash values contained in the hash value list created in step S120 (S121). Moreover, the management agent 20 specifies an entry having a hash value stored in the hash value column 22A (FIG. 15) and coinciding with the hash value selected in step S121 (this hash value will be hereinafter referred to as a selected hash value in the description with reference to FIG. 24) from respective entries of the file hash management information table 22 managed by the management agent 20 (FIGS. 3 and 15) (S122).

Thereafter, the management agent 20 transmits the file or others corresponding to the entry specified in step S122 to the copy destination storage device 5 to copy the file or others to the copy destination storage device 5. Moreover, the management agent 20 updates the copy-completion flag stored in the copy-completion flag column 43DX (FIG. 16) of the entry corresponding to the selected hash value in the copy target file list 43X of the copy process request 40 received at that time from "uncompleted" to "completed" (S123).

Furthermore, the management agent 20 determines whether or not the processing from step S122 to step S123 has been executed for all the hash values contained in the hash value list created in step S120 (S124). Subsequently, when a negative result is obtained in this determination, the management agent 20 returns to step S121, and then repeats the processing from step S121 to step S124 while sequentially switching the hash value selected in step S121 to a different hash value for which the processing in step S122 and following steps is not yet completed.

Thereafter, when an affirmative result is eventually obtained in step S124 by completing execution of the processing from step S122 to step S123 for all the hash values contained in the hash value list created in step S120, the management agent 20 then returns the copy process request 40 described above to the copy system creation and instruction unit 15 of the operation management device 3 (S125), and subsequently ends this cloud-to-cloud file copy process.

(5) Advantageous Effects of Present Embodiment

According to the information processing system 1 of the present embodiment described above, the copy system creation and instruction unit 15 of the operation management device 3 instructs the storage device 5 storing copy target data (volume data, file and/or object data) to copy, to the copy destination storage device 5, data determined by the data duplication comparison unit 14 to be duplicated with the copy target data in data present within the cloud system 2 to which the copy destination storage device 5 belongs, and then instructs the copy source storage device 5 to copy remaining data to the copy destination storage device 5.

Accordingly, in a case where the copy source storage device and the copy destination storage device belong to different cloud systems, the information processing system 1 of the present embodiment can reduce a data movement amount (data transfer amount) during a cloud-to-cloud copy process performed from the copy source storage device to the copy destination storage device, and therefore can reduce costs required for data copying by the amount corresponding to the reduction.

(6) Other Embodiments

According to the embodiment described above, the one operation management device 3 includes: the management information transmission/reception and storage unit 12 functioning as an information collection unit that collects, from the storage devices 5, predetermined information (hash values or bucket values) for determining presence or absence of duplication between data stored in one of the storage devices 5, and different data stored in a different one of the storage devices 5; the copy process acceptance unit 13 that accepts a copy process request for copying from the copy source storage device 5 to the storage device 5 included in the different cloud system 2; the data duplication comparison unit 14 that determines duplication between copy target data designated in the copy process request and respective data in the cloud system 2 to which the copy destination storage device 5 belongs on the basis of the predetermined information collected by the management information transmission/reception and storage unit 12; and the copy system creation and instruction unit 15 that creates a copy system of the data on the basis of a determination result obtained by the data duplication comparison unit 14, and instructs the needed storage device 5 to copy the copy target data to the storage device 5 corresponding to the copy destination in accordance with the created copy system. However, the present invention is not required to have this configuration. The management information transmission/reception and storage unit 12 and other units may be distributed to a plurality of computer devices constituting a distributed computing system, and disposed on the respective computer devices.

Moreover, according to the embodiment described above, the operation management device 3 has both the copy control function which controls a copy process between block storage devices, and the copy control function which controls a copy process between file/object storage devices. However, the present invention is not limited to this configuration. The operation management device 3 may have only either one of these copy control functions according to the storage type of the management target storage devices 5.

Furthermore, according to the embodiment described above, the foregoing copy control functions are included in the operation management device 3 which manages the operations of the storage devices 5 included in the information processing system 1. However, the present invention is not limited to this configuration. A copy control device having the foregoing copy control functions may be provided separately from the operation management device for managing the operations of the storage devices 5 included in the information processing system 1.

In addition, according to the embodiment described above, the hash management information transmitted from the management agents 8 and 20 of the respective storage devices 5 to the operation management device 3 is constituted by bucket values. However, the present invention is not limited to this configuration. This hash management information may be constituted by hash values for each chunk data string or each file and/or object. Processing contents performed by the operation management device 3 in this case are similar to the processing contents described above except for points that step S24 in FIG. 17, step S52 in FIG. 19, and step S92 in FIG. 22 are omitted, and that a comparison between hash values is made rather than a comparison between bucket values, for example.

Besides, according to the embodiment described above, the operation management device 3 directly transmits copy instructions (copy process request 40) to the respective storage devices 5 as instructions directed to the corresponding storage devices 5. However, the present invention is not limited to this configuration. The present invention is also applicable to a case where direct transmission to the storage devices 5 is not allowed. Specifically, depending on the type of the cloud systems 2, there is such a case where an instruction issued to the corresponding storage device 5 in one of the cloud systems 2 is received by a management device which manages the overall cloud systems 2, and then transferred from this management device to the corresponding storage device 5. In this case, the operation management device 3 transmits the copy process request 40 or the like to this management device.

The copy control device and the copy control method of the present invention are applicable to various configurations of an information processing system which includes a plurality of cloud systems each containing one or a plurality of storage devices.

What is claimed is:

1. A copy control device for controlling data copy between a plurality of cloud systems each including one or a plurality of storage devices, the copy control device comprising:
at least one processor configured to carry out processing to perform operations comprising:
collecting, from each of the storage devices of the respective cloud systems, a bucket value for determining presence or absence of duplication between data stored in one of the storage devices, and different data stored in a different one of the storage devices on a basis of which is probabilistically determinable;
accepting a copy process request for copying data from the storage device included in the cloud system corresponding to a copy source to the storage device included in a different cloud system of the cloud systems, the copy process request being associated with a hash value of a data string for each of a plurality of predetermined storage regions of copy target data;
calculating a bucket value on a basis of the hash value of the data string for each of the plurality of predetermined storage regions of the copy target data contained in the copy process request;
determining duplication between the copy target data designated in the accepted copy process request, and respective data included in the cloud system to which the storage device corresponding to a copy destination belongs by comparing the calculated bucket value and the bucket value collected for each of the storage devices; and
determining a copy system of the data on a basis of a determination result, and
instructing the storage device to copy the copy target data to the storage device corresponding to the copy destination in accordance with the determined copy system
instructing the different cloud system to copy the data included in the copy target data and determined as data duplicated with the data included in the different cloud system corresponding to the copy destination, from the storage device having the corresponding data to the storage device corresponding to the copy destination, and
instructing the cloud system corresponding to the copy source to copy remaining data of the copy target data to the storage device corresponding to the copy destination.

2. The copy control device according to claim 1, wherein the operations further comprise:
giving instructions on the copying such that processes are performed in an order of a copy process performed within a same storage device included in the different cloud system corresponding to the copy destination, a copy process performed between the different storage devices included in the different cloud system corresponding to the copy destination, and a copy process performed between the storage device included in the cloud system corresponding to the copy source and the storage device included in the different cloud system corresponding to the copy destination.

3. The copy control device according to claim 1, wherein the operations further comprise:
giving instructions on the copying such that processes are performed in an order of a copy process performed within a same storage device included in the different cloud system corresponding to the copy destination, a copy process performed between the different storage devices included in the different cloud system corresponding to the copy destination, and a copy process performed between the storage device included in the cloud system corresponding to the copy source and the storage device included in the different cloud system corresponding to the copy destination.

4. A copy control method executed by a copy control device for controlling data copy between a plurality of cloud systems each including one or a plurality of storage devices, the copy control method comprising:
a first step of collecting, from the storage devices of the respective cloud systems, a bucket value for determining presence or absence of duplication between data stored in one of the storage devices, and different data stored in a different one of the storage devices on a basis of which is probabilistically determinable;
a second step of accepting a copy process request for copying data from the storage device included in the cloud system corresponding to a copy source to the storage device included in a different cloud system of the cloud systems, the copy process request being associated with a hash value of a data string for each of a plurality of predetermined storage regions of copy target data;
a third step of calculating a bucket value on a basis of the hash value of the data string for each of the plurality of predetermined storage regions of the copy target data contained in the copy process request and determining duplication between the copy target data designated in the accepted copy process request, and respective data included in the cloud system to which the storage device corresponding to a copy destination belongs by comparing the calculated bucket value and the bucket value collected for each of the storage devices; and
a fourth step of determining a copy system of the data on a basis of a determination result, and instructing the storage device to copy the copy target data to the storage device corresponding to the copy destination in accordance with the determined copy system, wherein
the copy control device, in the fourth step, instructs the different cloud system to copy the data included in the copy target data and determined by the data duplication comparison unit as data duplicated with the data included in the different cloud system corresponding to the copy destination, from the storage device having the corresponding data to the storage device corresponding to the copy destination, and instructs the cloud system corresponding to the copy source to copy remaining data of the copy target data to the storage device corresponding to the copy destination.

5. The copy control method according to claim 4, wherein the copy control device, in the fourth step, gives instructions on the copying such that processes are performed in an order of a copy process performed within a same storage device included in the different cloud system corresponding to the copy destination, a copy process performed between the different storage devices included in the different cloud system corresponding to the copy destination, and a copy process performed between the storage device included in the cloud system corresponding to the copy source and the storage device included in the different cloud system corresponding to the copy destination.

6. A copy control device for controlling data copy between a plurality of cloud systems each including one or a plurality of storage devices, the copy control device comprising:
at least one processor configured to carry out processing to perform operations comprising:
collecting, from each of the storage devices of the respective cloud systems, a bucket value for determining presence or absence of duplication between data stored in one of the storage devices, and different data stored in a different one of the storage devices on a basis of which similarity is probabilistically determinable;
accepting a copy process request for copying data from the storage device included in the cloud system corresponding to a copy source to the storage device included in a different cloud system of the cloud systems, the copy process request is associated with a hash value of a data string for each of the files and/or the objects corresponding to a copy target;
calculating the bucket value on a basis of the hash value of the data string for each of the files and/or the objects corresponding to the copy target and contained in the copy process request;
determining duplication between the files and/or the objects corresponding to the copy target, and the files and the objects included in the cloud system to which the storage device corresponding to the copy destination belongs by comparing the calculated hash value with the bucket value for each of the files and the objects stored in the respective storage devices; and
determining a copy system of the data on a basis of a determination result; and
instructing the storage device to copy the copy target data to the storage device corresponding to the copy destination in accordance with the determined copy system;
instructing the different cloud system to copy the data included in the copy target data and determined as data duplicated with the data included in the different cloud system corresponding to the copy destination, from the storage device having the corresponding data to the storage device corresponding to the copy destination, and
instructing the cloud system corresponding to the copy source to copy remaining data of the copy target data to the storage device corresponding to the copy destination.

* * * * *